US 8,008,876 B2

(12) United States Patent
Yonemori et al.

(10) Patent No.: US 8,008,876 B2
(45) Date of Patent: Aug. 30, 2011

(54) HYBRID ELECTRIC VEHICLE

(75) Inventors: Kei Yonemori, Hiroshima (JP); Nobuhide Seo, Hiroshima (JP); Kohei Saito, Higashihiroshima (JP); Hirofumi Akagi, Kawasaki (JP); Hideaki Fujita, Yokohama (JP)

(73) Assignee: Mazda Motor Corporation, Hiroshima (JP)

( * ) Notice: Subject to any disclaimer, the term of this patent is extended or adjusted under 35 U.S.C. 154(b) by 584 days.

(21) Appl. No.: 12/144,580

(22) Filed: Jun. 23, 2008

(65) Prior Publication Data

US 2008/0315803 A1 Dec. 25, 2008

(30) Foreign Application Priority Data

Jun. 25, 2007 (JP) .................. 2007-165966
Dec. 4, 2007 (JP) .................. 2007-313219
Dec. 5, 2007 (JP) .................. 2007-315041

(51) Int. Cl.
*H02P 25/30* (2006.01)
*H02P 7/00* (2006.01)
(52) U.S. Cl. ......... 318/151; 318/139; 318/148; 318/376
(58) Field of Classification Search .................. 318/151, 318/139, 148, 376
See application file for complete search history.

(56) References Cited

U.S. PATENT DOCUMENTS

| 5,545,928 | A | | 8/1996 | Kotani |
| 5,589,743 | A | * | 12/1996 | King ............................. 318/139 |
| 6,215,198 | B1 | | 4/2001 | Inada et al. |
| 2007/0137908 | A1 | | 6/2007 | Fujiwara et al. |

FOREIGN PATENT DOCUMENTS

JP 2005-204370 7/2005

OTHER PUBLICATIONS

European Patent Office, International Search Report of EP08011267.5, Sep. 26, 2008, 1 page.

* cited by examiner

*Primary Examiner* — Walter Benson
*Assistant Examiner* — Erick Glass
(74) *Attorney, Agent, or Firm* — Alleman Hall McCoy Russell & Tuttle LLP

(57) ABSTRACT

A hybrid electric vehicle includes, in one example, a motor-generator driven by an engine to generate alternating current, wherein the motor-generator is further configured to start the engine, a motor for driving the vehicle, a diode rectifier to rectify alternating current generated by the motor-generator, an inverter connected to a feed circuit between the diode rectifier and the motor to convert direct current in the feed circuit into alternating current, a power supply connected to a line connecting the diode rectifier with the inverter, a first feed circuit to supply current to the motor to drive the vehicle through the diode rectifier and the inverter in series a second feed circuit to connect the motor-generator with the power supply while bypassing at least the diode rectifier, and an alternating current converter provided in the second feed circuit.

12 Claims, 17 Drawing Sheets

HYBRID ELECTRIC VEHICLE

TECHNICAL FIELD

The present description relates to hybrid electric vehicles. More particularly, the description pertains to a hybrid electric vehicle configuration suitable for a series hybrid electric vehicle.

BACKGROUND AND SUMMARY

The series hybrid electric vehicle designates a vehicle configured to drive an electric generator by an internal combustion engine (engine), to supply electric power from the electric generator to a motor, and to drive drive-wheels by the motor, as disclosed in US 2007/0137908 A1, as an example. In a series hybrid electric vehicle, the engine is dedicated to generating electric energy; the mechanical energy generated by the engine is not directly transmitted to the drive-wheel, in contrast to a parallel hybrid electric vehicle, where some mechanical energy generated by an engine is directly transmitted to a drive-wheel.

One example of a hybrid electric vehicle is described by Japanese Unexamined Patent Application Publication No. 2005-204370.

This example discloses a hybrid electric vehicle configuration that uses a diode rectifier to reduce the loss of electric energy generated by the system by rectifying current generated by a motor-generator driven by the engine and then driving a motor connected to a vehicle driving system.

When an output current from the motor-generator is rectified by the diode rectifier as disclosed in this related reference, the loss of electric energy generated by the system can be reduced.

However, the inventor herein has recognized a disadvantage with the approach used in this related reference. Specifically, since a diode rectifier passes a direct current, a motor-generator will not work as a starter for an engine due to the unidirectional flow of the direct current. In one approach, to address this problem, an inverter may be placed between the diode rectifier and the motor to power the motor-generator during an engine start. However, this approach introduces another problem; specifically, a motor cannot be driven during an engine start when a driving motor is required.

Further, since a capacity requested for an inverter changes significantly depending on vehicle operating conditions, when the vehicle is operating under a certain condition where the inverter is operated with an output much smaller than a rated output, the inverter cannot be used efficiently due to a decreasing inverter loading rate.

Therefore, there is a need for providing a hybrid electric vehicle that can make effective use of an inverter to operate with higher efficiency.

One example embodiment of the present description is a hybrid electric vehicle comprising: a motor-generator driven by an engine to generate alternating current and serving as a starter driving the engine when the engine is started, a motor for driving the vehicle, a diode rectifier for rectifying alternating current generated by the motor-generator, an inverter connected to a feed circuit between the diode rectifier and the motor and converting direct current in the feed circuit into alternating current, a power supply connected to a line connecting the diode rectifier with the inverter, a first feed circuit for supplying current to a motor for driving the vehicle through the diode rectifier and the inverter in series, a second feed circuit to connect the motor-generator with the power supply while bypassing at least the diode rectifier and an alternating current converter provided in the second feed circuit.

This hybrid electric vehicle overcomes at least some of the disadvantages of the approach of the related reference described above.

In an example embodiment, the hybrid electric vehicle may further comprise a controller for controlling power distribution to a first feed circuit and a second feed circuit, wherein the controller includes: an operating condition determining module for determining an operating condition of the vehicle, wherein determining the operating condition includes determining a demand for cranking the engine using the motor-generator; and a cranking control module for supplying power from the power supply to the motor-generator via the second feed circuit when a cranking demand is detected.

In one example embodiment, the alternating current converter is a semiconductor switch.

In another example embodiment, the alternating current converter is a second inverter placed in parallel with the first feed circuit. And, the hybrid electric vehicle further comprises: a switch device to selectively switch between a motor power feeding mode where the power supply is connected to the motor via the second inverter and a starter power feeding mode where the power supply is connected to the motor-generator via the second inverter.

As a nonlimiting example, one or more relay switches or insulated gate bipolar transistors, etc., may be used as an element of the "switch device".

In one example embodiment, the switch device may be a relay switch. In this example, a hybrid electric vehicle may further comprise a controller configured to switch the relay switch from one mode to another after turning off the second inverter, for example, when a switch is requested while the second inverter is in an on-state.

In another example embodiment, a hybrid electric vehicle may further comprise a feed line for an electric load, the feed line provided in a switch device, and an electric component, such as a 100V alternating current source and/or an air-conditioning unit for a vehicle cabin, as non-limiting examples, wherein the electric component is connected to the feed line such that the second inverter can feed to the electric component.

In another example embodiment, the cranking control module may be configured to control the inverter and the second feed circuit such that electric power generated by the power supply is supplied from the inverter to the motor-generator via the second feed circuit while driving current for the motor from the inverter is restricted, when it is determined that there is a cranking demand while the vehicle is stopped.

In another example embodiment, the cranking control module may be configured to control the inverter and the second feed circuit such that direct current from the power supply is converted to alternating current in the alternating current converter and the alternating current is provided to the motor-generator.

In another example embodiment, the motor-generator is a polyphase alternating current device, and the cranking control module is configured to control the inverter and the second feed circuit such that direct current from the power supply is converted to high frequency monophase alternating current in the inverter and, the monophase alternating current is converted to polyphase alternating current having the same phase number as the motor-generator, and the polyphase alternating current is provided to the motor-generator.

In another example embodiment, the hybrid electric vehicle may further comprise a switch between the inverter and the motor, wherein the cranking control module is configured to control the inverter, the second feed circuit and the switch such that the switch is shut off before current is fed from the power supply to the motor-generator, when there is a cranking demand while the vehicle is stopped.

In this way, at least some of the disadvantages of the related reference described above are overcome.

DETAILED DESCRIPTION

Figure 1:
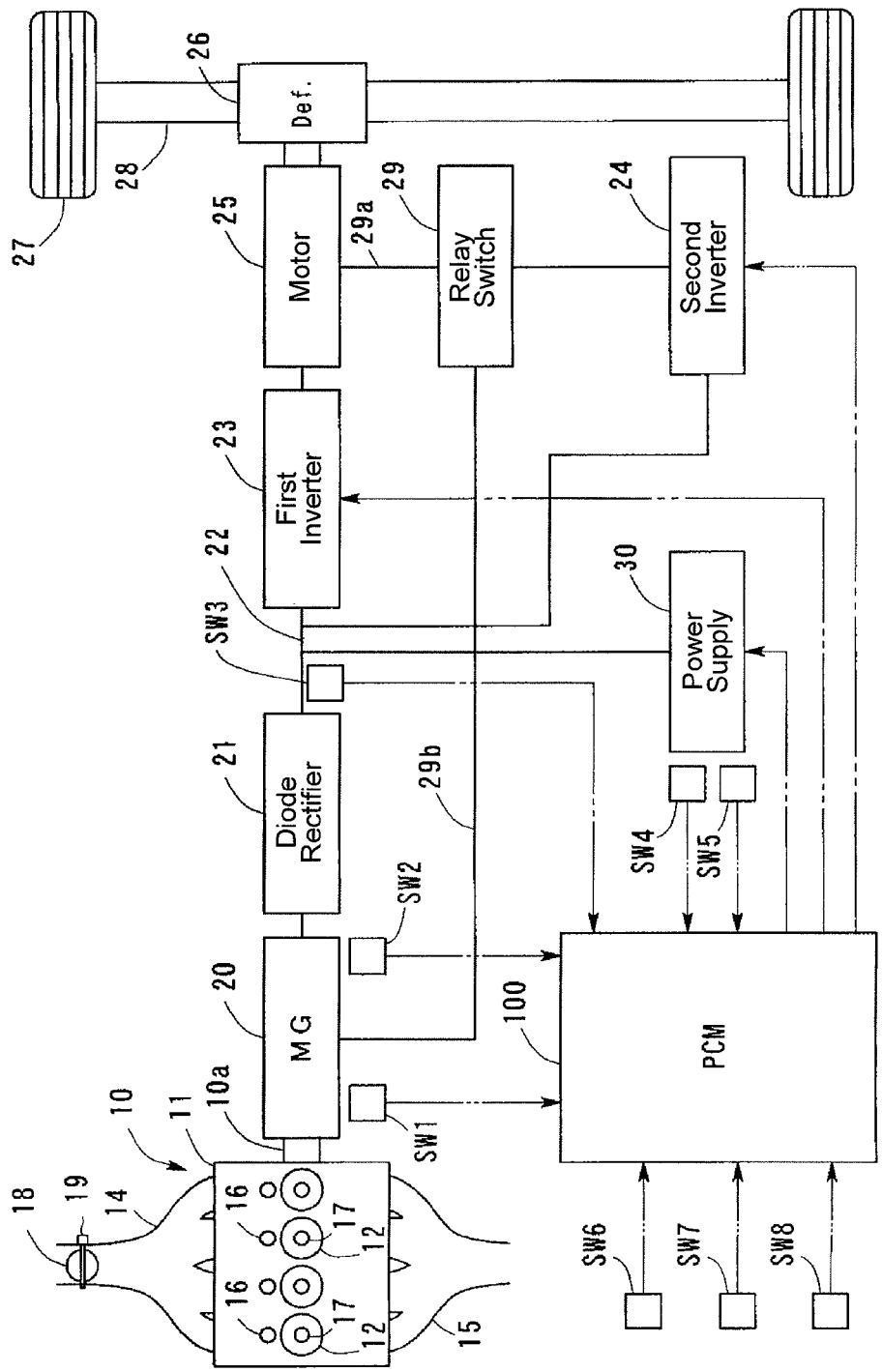
FIG. 1 is a schematic block diagram of a hybrid electric vehicle according to an embodiment of the present invention.

Hereafter, several embodiments of the present invention will be explained referring to the accompanying drawings. In the following embodiments, like reference numerals are given to like components to omit repeating explanations thereof.

First Embodiment

Figure 2:
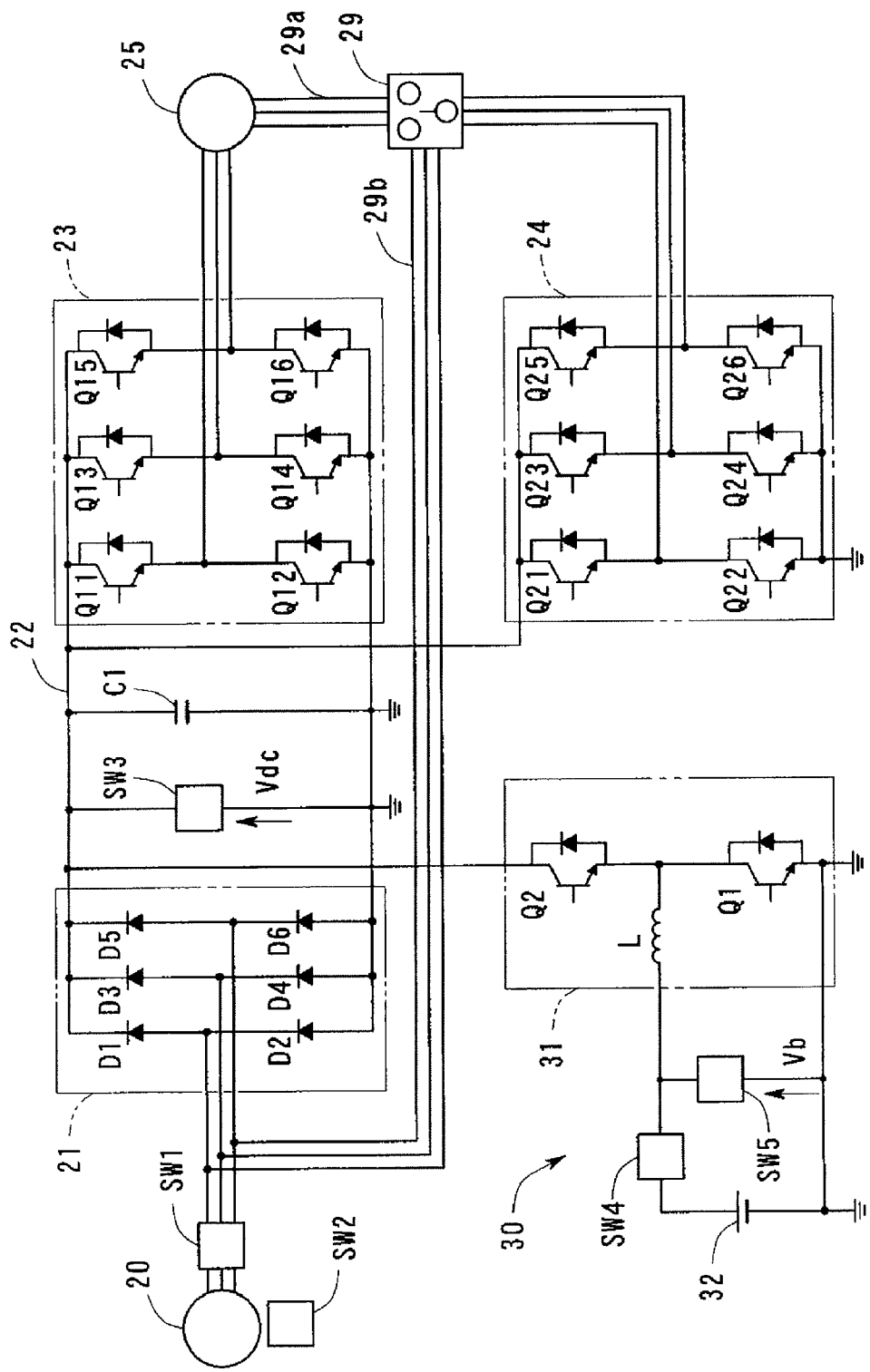
FIG. 2 is a circuit diagram showing a particular portion of FIG. 1.

FIG. 1 is a schematic block diagram of a hybrid electric vehicle according to an embodiment of the present invention, and FIG. 2 is a circuit diagram showing a particular portion of FIG. 1. Referring first to FIG. 1, the vehicle is a series-hybrid-electric vehicle in this embodiment, which typically includes an internal-combustion engine 10, and an electric motor generator 20 that is driven by the engine 10.

In this embodiment, the engine 10 is a multi-cylinder four-cycle engine, which includes a body 11, a substantial portion of which is constituted with a cylinder head and a cylinder block, two or more cylinders 12 formed inside the body 11, an air-intake manifold 14 that introduces fresh air into each cylinder 12, and an exhaust manifold 15 that discharges exhaust gas from each cylinder 12 after combustion. Each cylinder 12 includes a fuel-injection valve 16 and a spark plug 17. A piston is provided inside each cylinder 12 so that it reciprocally moves to drive a crankshaft 10a connected to the piston. A throttle valve 18 for adjusting an amount of fresh intake air is provided inside the air-intake manifold 14, and is driven by an actuator 19 of the throttle body.

Referring also to FIG. 2, in this embodiment, the motor generator 20 is a multiphase electric motor generator (three-phase in this embodiment) connected to the crankshaft 10a. The motor generator 20 has a function to output AC current when driven by the engine 10, as well as an inverse function to serve as an electric motor to start the engine 10 when supplied with AC current. The motor generator 20 includes a generator-output-current sensor SW1 that detects an output current from the motor generator 20, and a generator-rotational-speed sensor SW2 that detects a rotational speed of the motor generator 20.

The motor generator 20 is connected to a diode rectifier 21. The diode rectifier 21 includes two or more sets of diodes D1-D6 corresponding to number of phases "n" of the motor generator 20. Output terminals of the diode rectifier 21 are connected to a DC bus line 22 as a power feed channel.

A capacitor C1 is connected also to the DC bus line 22. Further, a DC bus line voltage sensor SW3 that detects a voltage of the DC bus line 22 is connected to the DC bus line 22.

In this embodiment, first and second inverters 23 and 24 are connected to the DC bus line 22 in parallel with each other. The inverters 23 and 24 each include two or more sets of electrical elements Q11-Q16 and Q21-Q26, respectively, corresponding to number of phases of a poly-phase motor 25 which serves as a load. Each of the elements Q11-Q16 and Q21-Q26 includes a transistor, a diode, etc.

As shown in FIG. 1, the first inverter 23 is connected to the motor 25. The motor 25 is connected to a differential mechanism 26 for driven wheels 27 (e.g., rear wheels) of the vehicle, and drives an axle 28 of the rear wheels 27 through the differential mechanism 26. In this embodiment, the motor 25 also functions as a generator for battery recharging.

The second inverter 24 is connected to a relay switch 29 as a switching module. The relay switch 29 is switchable between a power feed channel 29a for a "normal operation" in which the second inverter 24 is connected to the motor generator 20, and a power feed channel 29b for an "engine startup operation" in which the second inverter 24 is connected to the motor 25. In other words, the second inverter 24 can be selectively connected either to channel 29a or 29b. As a result, according to the operating condition, the second inverter 24 can cause AC current to flow into the motor 25 along with the first inverter 23, or can cause AC current to flow into the motor generator 20 to drive the engine 10 at engine startup.

Further, a power supply module 30 is connected to the DC bus line 22. The power supply module 30 includes a DC-DC converter 31, and a battery 32 connected to the DC-DC converter 31.

The DC-DC converter 31 includes a booster element Q1, a step-down element Q2, and a reactor L. The elements Q1 and Q2 each include a transistor. As turning ON and OFF the transistor of the booster element Q1 at a predetermined timing to maintain the transistor of the step-down element Q2 at OFF, the reactor L can be charged to make the battery 32 higher in absolute voltage than DC bus line 22, and thus, electric power flows from the battery 32 to the DC bus line 22. In addition, as turning ON and OFF the transistor of the step-down element Q2 at a predetermined timing to maintain the transistor of the booster element Q1 at OFF, the DC bus line 22 can be made higher in absolute voltage than battery 32, and thus, electric power flows from the DC bus line 22 into the battery 32.

The power supply module 30 further includes a battery current sensor SW4 that detects current flowing through the battery 32 as a battery current Ib, and a battery voltage sensor SW5 that detect voltage of the battery 32 as a battery voltage Vb.

Further, as shown in FIG. 1, the vehicle includes a vehicle speed sensor SW6, a gas-pedal opening sensor SW7, and a brake sensor SW8, to detect an operating condition of the vehicle.

Figure 3:
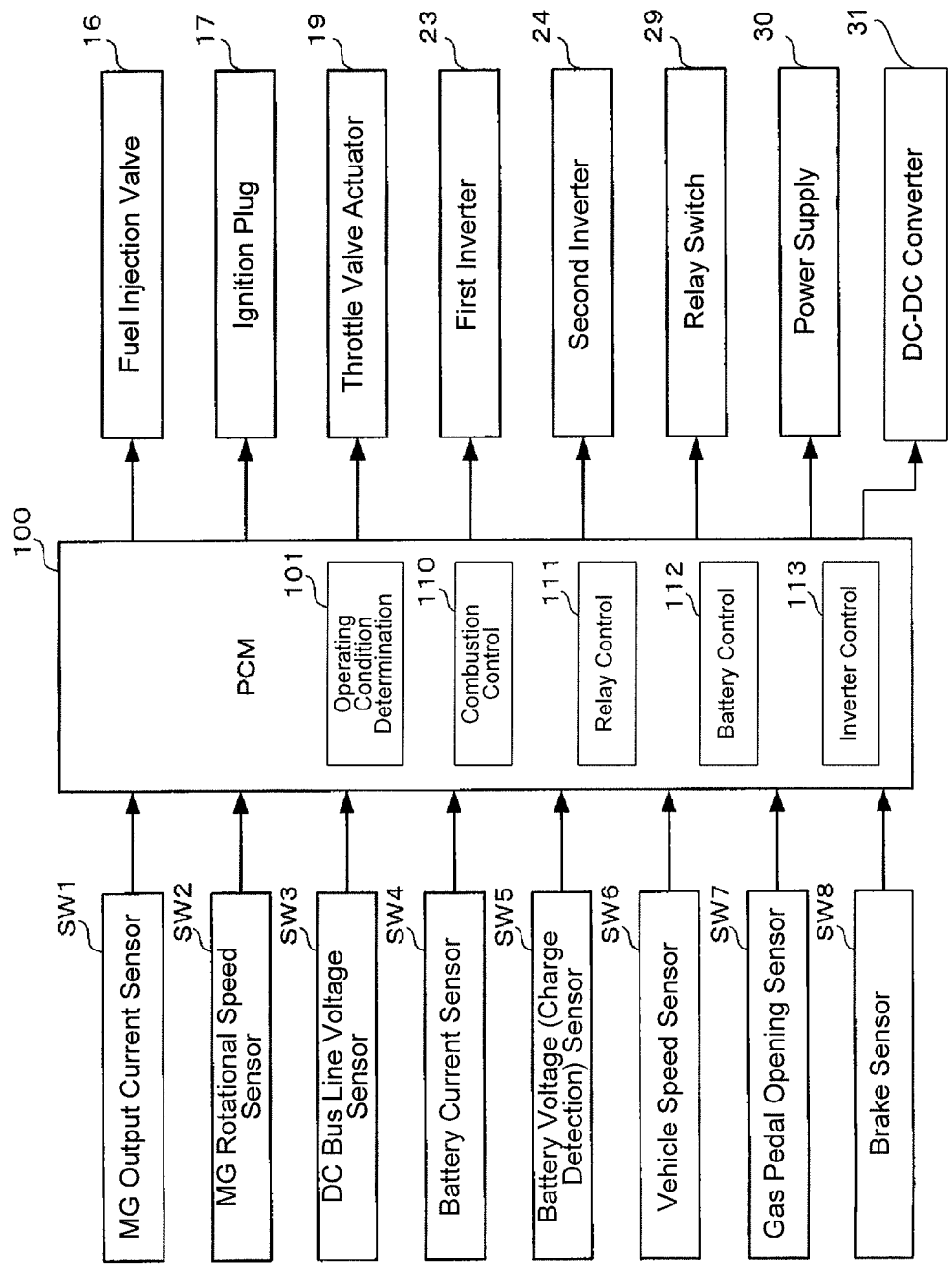
FIG. 3 is a block diagram showing a schematic configuration of the hybrid electric vehicle shown in FIGS. 1 and 2.

Referring to FIG. 3, which is a block diagram showing a schematic configuration of the hybrid electric vehicle shown in FIGS. 1 and 2. In this embodiment, each component of the vehicle is controlled by a control unit 100 as a control module, such as a powertrain control module (PCM).

The control unit 100 may be a microprocessor provided with a CPU, a memory, etc. Typically, the control unit 100 reads a detection signal from an input component according to a program module, to perform a predetermined calculation process, and outputs a control signal to an output component. Although the control unit 100 is illustrated as a single unit in FIG. 3, it may be a module assembly of two or more modules.

In this embodiment, the input component of the control unit 100 includes the generator-output-current sensor SW1, the generator-rotational-speed sensor SW2, the DC bus line voltage sensor SW3, the battery current sensor SW4, the battery voltage sensor SW5, the vehicle speed sensor SW6, the gas-pedal opening sensor SW7, and the brake sensor SW8.

In this embodiment, the output component of the control unit 100 includes the fuel-injection valves 16, the spark plugs 17, the throttle valve actuators 19, the first and second inverters 23 and 24, the relay switch 29, and the DC-DC converter 31. Although it is not particularly illustrated, the output may also be connected to various sensors (e.g., a coolant temperature sensor, a rotational angle sensor, a throttle opening sensor, etc.) with which the engine 10 is equipped for a combustion control thereof.

In this embodiment, the control unit 100 includes logical components, such as an operating-condition determination module 101, a combustion control module 110 that performs an operation control of the engine 10, a relay control module 111 that performs a power supply control with the relay switch 29, a battery control module 112 that controls the DC-DC converter 31, and an inverter control module 113.

The operating-condition determination module 101 determines an operating condition of the vehicle based on detections of the sensors SW1-SW7. In this embodiment, the operating-condition determination module 101 also functions to determine an existence of an engine operation request of the vehicle.

The combustion control module 110 controls the fuel-injection valves 16, spark plugs 17, and throttle valve actuators 19 to control the rotational speed of the engine 10 (i.e., engine speed) and the rotational speed of the motor generator 20.

The relay control module 111 switches the relay switch 29 based on a determination result of the operating-condition determination module 101 between the motor power feeding mode in which the second inverter 24 is connected to the motor 25 from the first feed channel 29a for the normal operation, and the starter power feeding mode in which the second inverter 24 is connected to the generator 20 from the second feed channel 29b for the engine startup operation to drive the motor generator 20 as a motor to start the engine 10.

The battery control module 112 normally functions based on the output from the battery current sensor SW4 and the battery voltage sensor SW5 to maintain the output current from the battery 32 during the use of the power supply module 30, and to prevent overcurrent during the battery recharging.

The inverter control module 113 controls the ON/OFF operation of the first and second inverters 23 and 24 based on the determination result of the operating-condition determination module 101 to control a load condition of an object to be supplied with power from each of the inverters 23 and 24, so as to be optimized.

In this embodiment, the control unit 100 controls the engine 10, the motor generator 20, the first and second inverters 23 and 24, the motor 25, the relay switch 29, and the DC-DC converter 31 based on the determination result of the operating-condition determination module 101. By this control, the relay switch 29 is switched to connect the second inverter 24 to the motor 25 within an operating range at the engine startup or low torque. Power of the battery 32 is then supplied from the first and second inverters 23 and 24 to the motor 25, and the vehicle is then driven according to the power supply from the battery 32. Alternatively, within an operating range where a requested load is a high or middle torque, the relay control module 111 switches the relay switch 29 to the starter power feeding mode based on a flowchart described later, to start the engine 10 using the motor generator 20 as a generator. After the engine 10 is started, the current supplied from the motor generator 20 drives the motor 25 via first inverter 23.

Figure 4:
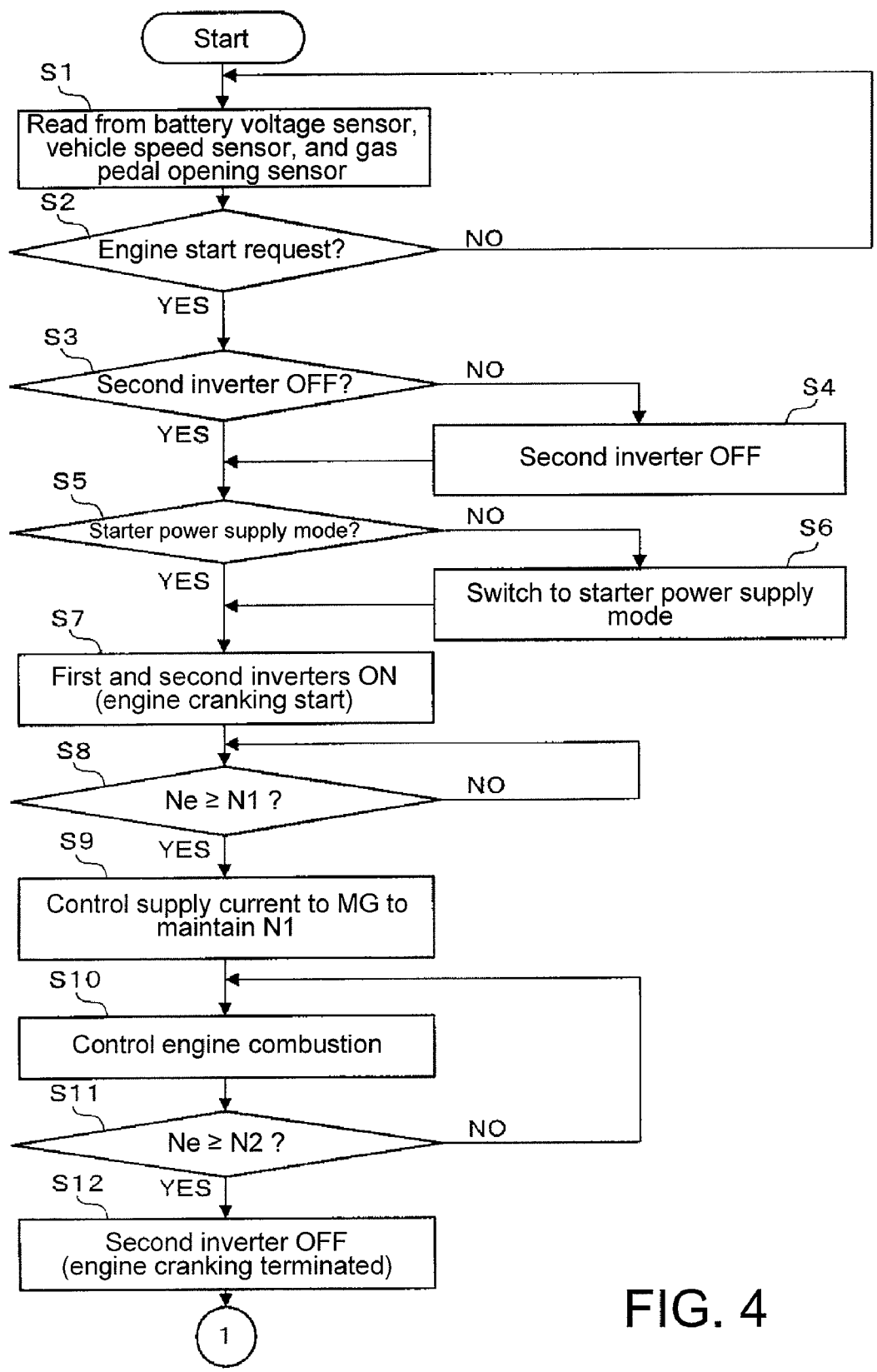
FIG. 4 is a flowchart showing an example of control at engine startup by a control unit shown in FIG. 1, the flowchart continuing to FIG. 5.
Figure 5:
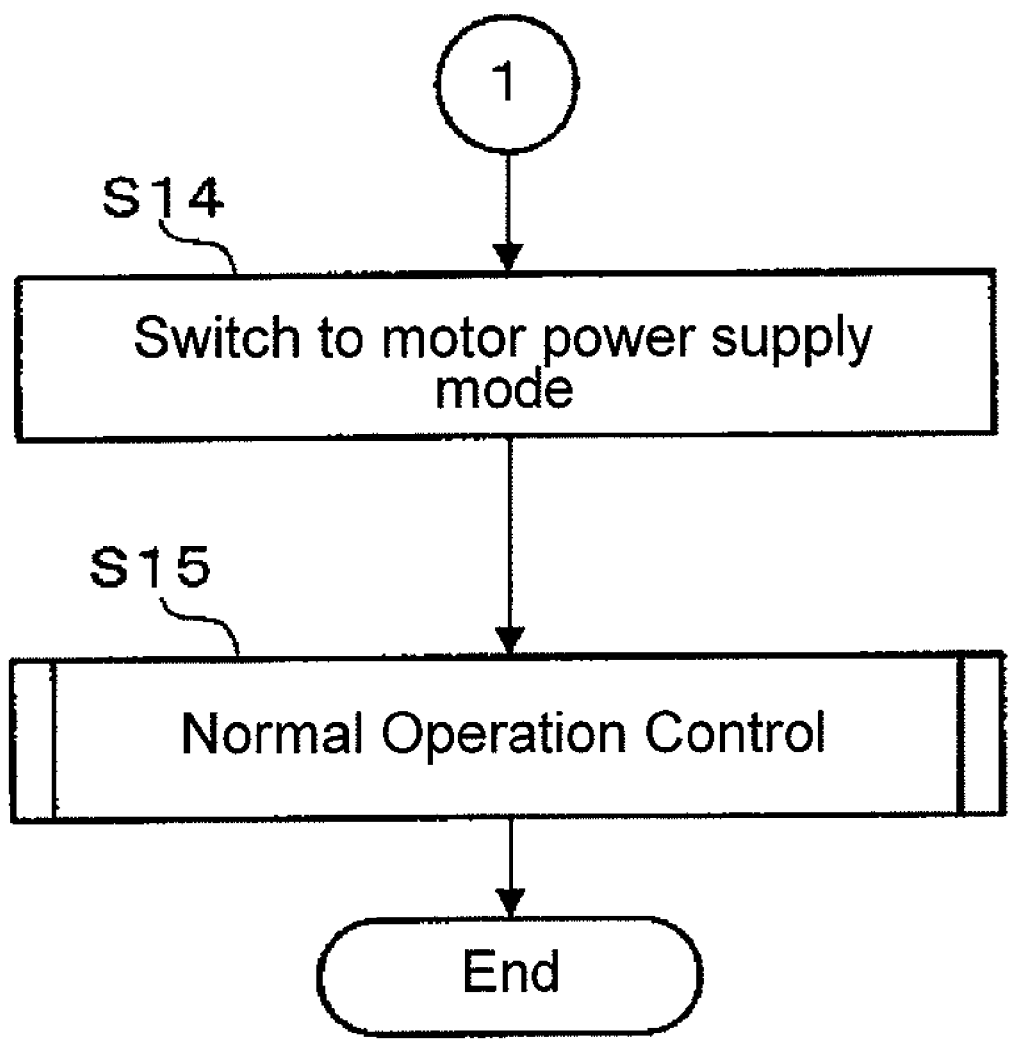
FIG. 5 is a flowchart showing the example of control at engine startup by the control unit shown in FIG. 1, the flowchart continuing from FIG. 4.

The flowchart of FIGS. 4 and 5 illustrates an example control routine that is executed upon starting the engine 10 from a stopped condition. First, at Steps S1 and S2, the control unit 100 causes the operating-condition determination module 101 to determine an existence of the starting request of the engine 10 by a known method based on the detection signals from the battery voltage sensor SW5, the vehicle speed sensor SW6, the gas-pedal opening sensor SW7, and brake sensor SW8. Here, when the vehicle is operated within a high or middle load operating range while the brake is not pressed down and the gas pedal is pressed down, the determination module 101 determines that there is a starting request.

When the determination module 101 determines that there is a starting request, at Step S3, the control unit 100 then causes the determination module 101 to determine whether the second inverter 24 is OFF. When the second inverter 24 is ON, at Step S4, the control unit 100 turns the second inverter 24 OFF. When the second inverter 24 is OFF, at Step S5, the control unit 100 further causes the determination module 101 to determine whether the relay switch 29 is in the starter power feeding mode (i.e., a mode in which the second inverter 24 is connected to the motor generator 20).

When the relay switch 29 is not in the starter power feeding mode, in other words, when it is in the motor power feeding mode (i.e., a mode in which the second inverter 24 is connected to the motor 25), at Step S6, the control unit 100 causes the relay control module 111 to switch the relay switch 29 to the starter power feeding mode in order to connect the second inverter 24 to the motor generator 20. On the other hand, when relay switch 29 is in the starter power feeding mode or when it is already switched to the starter power feeding mode, at Step S7, the control unit 100 causes the inverter control module 113 to turn ON both the first and second inverters 23 and 24, to start engine cranking.

In this case, if a voltage Vdc of the DC bus line 22 is lower than a voltage Vb of the battery 32, the control unit 100 causes the battery control module 112 to perform the boosting operation of the DC-DC converter 31. Accordingly, current flows from the power supply module 30 through the DC bus line 22 into the first and second inverters 23 and 24. Then, from the first inverter 23, driving current that drives the motor 25 flows, while from the second inverter 24, driving current that drives the motor generator 20 flows. As a result, the motor generator 20 functions as a motor, and drives the crankshaft 10*a* to start the engine 10, while the motor 25 is driven to drive the vehicle in parallel with the engine startup.

Thus, in this embodiment, adopting two or more inverters 23 and 24 can achieve the engine startup operation by the motor generator 20 and the drive operation of the vehicle by the motor 25 simultaneously, in parallel with each other.

When the engine 10 is driven, at Step S8, the determination module 101 stands by so that the rotational speed Ne of the motor generator 20 (i.e., engine speed) reaches a predetermined starting speed N1. If the rotational speed Ne becomes greater than the starting speed N1, at Step S9, the control unit 100 controls the supply current so that the rotational speed Ne is maintained at the starting speed N1. More specifically, the supply current may be adjusted by the switching operation of the DC-DC converter 31 with the battery control module 112, and by controlling of the second inverter 24 with the inverter control module 113.

Next, at Step S10, the control unit 100 causes the combustion control module 110 to control an air-intake pressure, fuel-injection amount, fuel-injection timing, and ignition timing of the engine 10 based on a well-known engine control method to perform a combustion control of the engine 10. Next, at Step S11, the determination module 101 stands by so that the rotational speed Ne of the motor generator 20 reaches a predetermined startup termination speed N2.

If the rotational speed Ne becomes greater than startup termination speed N2, at Step S12, the control unit 100 causes the inverter control module 113 to once turn OFF the second inverter 24 to terminate the cranking operation.

Next, now referring to FIG. 5, if the current stops, at Step S14, the control unit 100 causes the relay control module 111 to switch the relay switch 29 to the motor power feeding mode. Then, at Step S15, the control unit 100 proceeds the normal operation mode to control the ON/OFF operations of both the inverters 23 and 24 and the switching operation of the DC-DC converter 31. In this embodiment, even after the relay switch 29 is switched to the motor power feeding mode, the second inverter 24 is turned ON and OFF according to the operating condition. Therefore, it is possible to improve efficiency of the first inverter 23, and improve efficiency of the power supply system as well.

Figure 6:
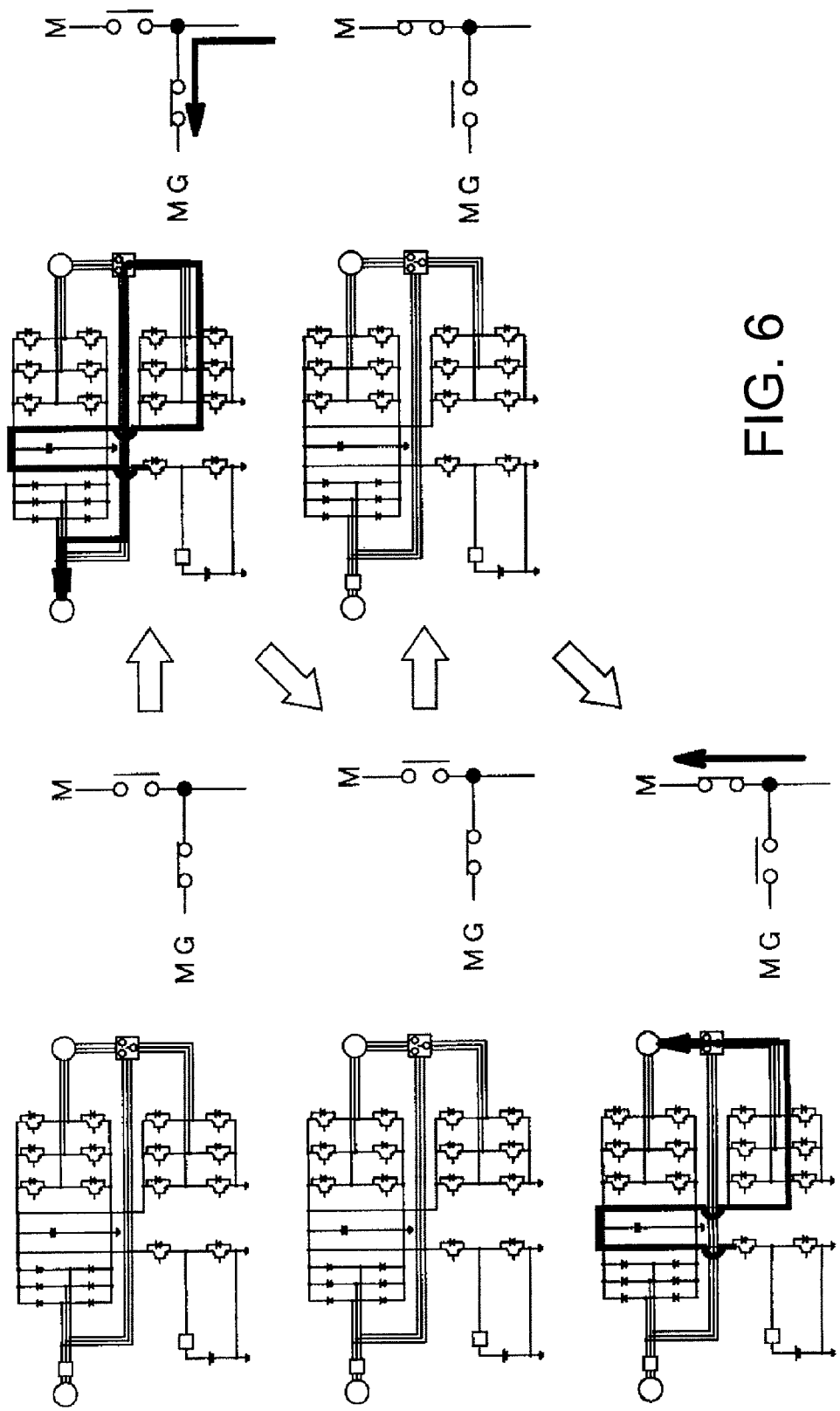
FIG. 6 is a state transition diagram showing a flow of current during engine cranking while executing the control of FIGS. 4 and 5.

FIG. 6 is a state transition diagram showing the current flow during the engine cranking while executing the control of FIGS. 4 and 5. Because the switching of the operating modes is realized by the relay switch 29 in this embodiment, loss is reduced compared with a switching module using an insulated gate bipolar transistor, although a possibility of deterioration is greater when switching while supplying power.

Therefore, in this embodiment, during an operating condition where the switching of the operating mode is necessary, as shown in FIG. 6, first, at Steps S4 and S12 (FIG. 4), the control unit 100 causes the relay switch 29 to stop the supply current, and then, at Step S6 (FIG. 4) and Step S14 (FIG. 5), the control unit 100 causes the relay switch 29 to switch to supply current again. Therefore, it is possible to realize a circuit architecture with reduced loss, preventing the deterioration of the relay switch 29.

Figure 7:
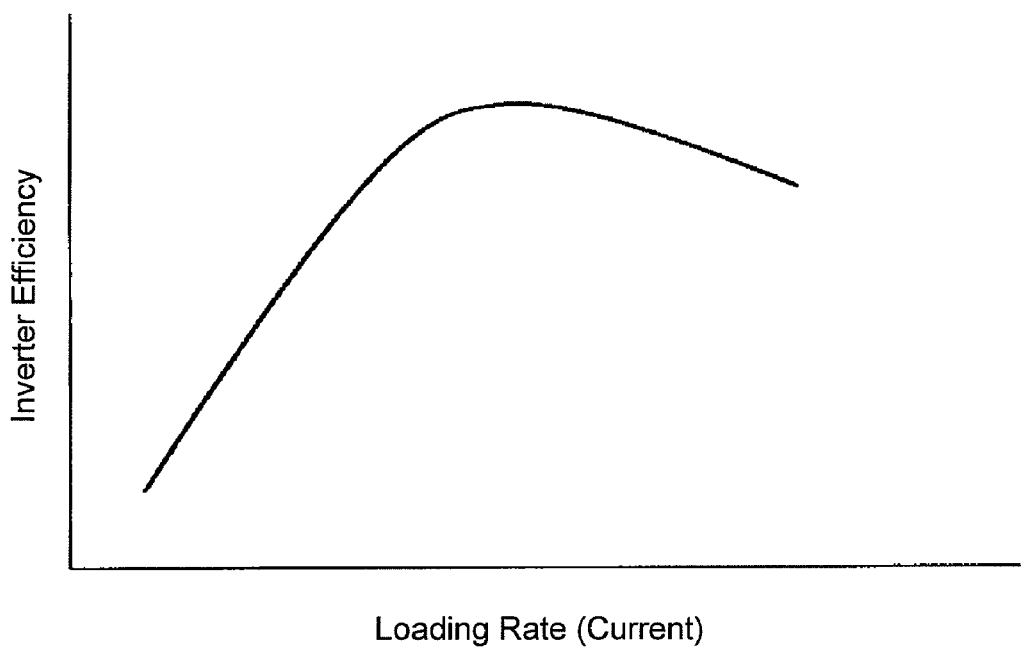
FIG. 7 is a characteristic graph of inverters shown in FIGS. 1-3.

Further, in this embodiment, by connecting the diode rectifier 21 to the motor generator 20 driven by the engine 10, efficiency of the power generation system can be improved, and the power supply system with reduced loss can be achieved, as described above. In addition, two inverters 23 and 24 connected in parallel to the DC bus line 22 to which the diode rectifier 21 is connected are provided, and by the relay switch 29, the power supply module 30 is selectively connected to the motor generator 20 or the motor 25 through the second inverter 24, as described above. Thus, it may be possible to drive the motor 25 by the first inverter 23 when the motor 25 is required to be driven at engine startup, while the motor 25 is driven by the second inverter 24. FIG. 7 is a characteristic graph of the inverters. A general inverter typically includes diodes, such as elements Q11-Q16 and Q21-Q26 as shown in FIG. 2. Thus, as shown in FIG. 7, it has a characteristic that its efficiency remarkably decreases in an operating range where a loading rate (i.e., output current) is low. On the other hand, in this embodiment, two or more inverters are provided, and when current necessary for the power supply is small, it operates while one of the inverters (mainly, the second inverter 24 in this embodiment) is turned OFF. Thus, it is possible to improve the loading rate of the active inverter, leading to the improvement of the efficiency of the inverter, and thereby improving the efficiency of the entire power supply system.

Further, in this embodiment, the relay switch 29 is adopted as a switching module. For this reason, a circuit with reduced loss can be constructed as compared with a case where the insulated gate bipolar transistor is adopted, as described above.

Further, in this embodiment, upon switching the relay switch 29, when the second inverter 24 is ON, the second inverter 24 is turned OFF. After that, the relay switch 29 is switched, and the second inverter 24 is then turned back ON. For the reason, in this embodiment, because the switching operation is performed in a state where current is not supplied to the relay switch 29, deterioration of the relay switch 29 can be reduced and, thus, longer life of the switch can be achieved.

The above embodiment merely illustrates a particular example of the present invention and, thus, the invention may not be limited to the embodiment.

Second Embodiment

Figure 8:
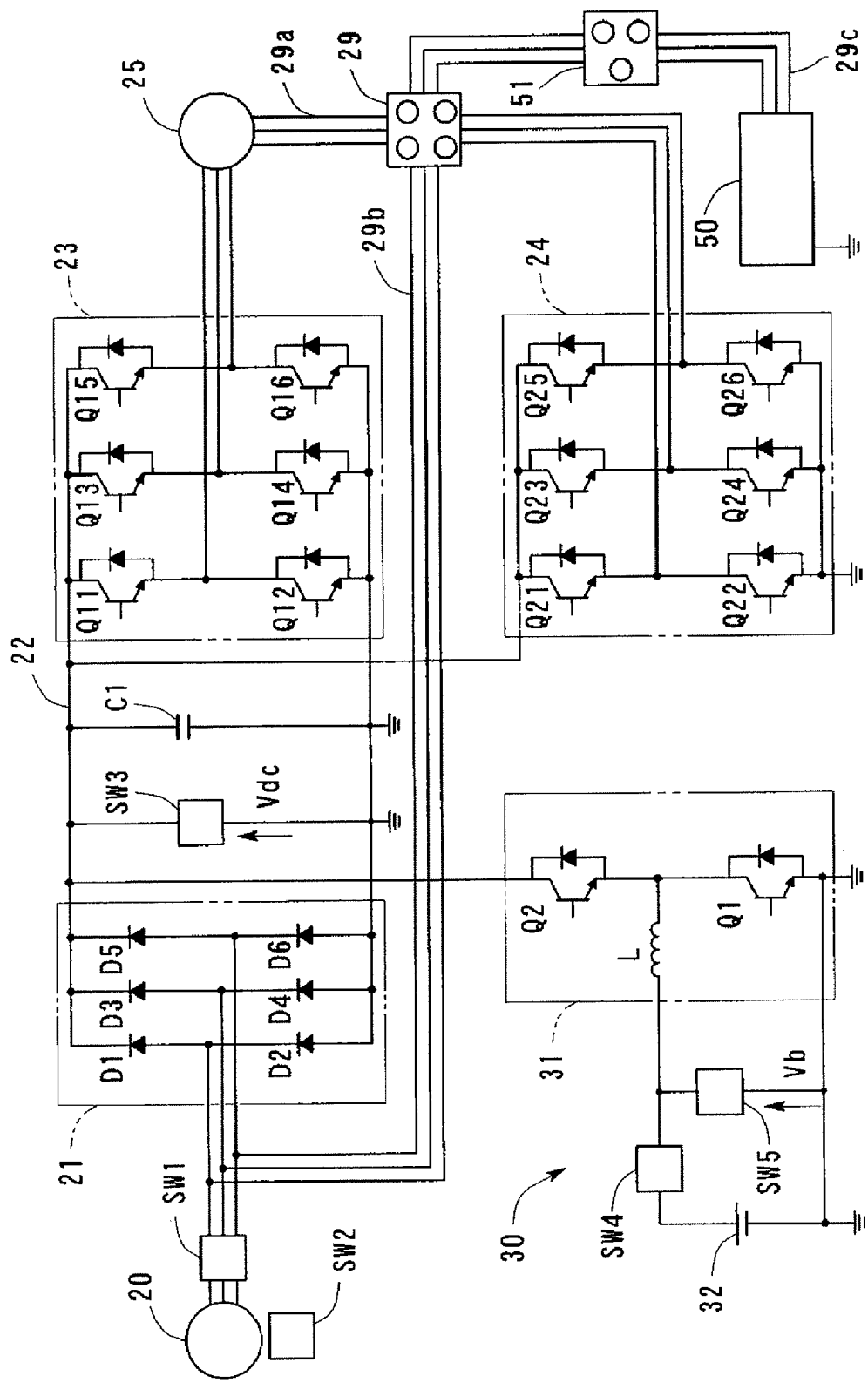
FIG. 8 is a circuit diagram according to another embodiment of the invention.

FIG. 8 is a circuit diagram according to another embodiment of the invention, similar to that shown in FIG. 2. In this embodiment, the relay switch 29 that can switch the second inverter 24 between three channels is adopted as the switching module, and a third power feed line 29*c* for loading is connected to the relay switch 29. The feed line 29*c* is connected to electric equipment 50, and an ON/OFF relay switch 51 is connected between the electric equipment 50 and the relay switch 29.

The electric equipment 50 may include an on-board power supply (AC100V), an air-conditioning unit for vehicle cabin, etc. In an operating range where the second inverter 24 is not necessary to supply power to the motor 25, the electric equipment 50 is supplied with power from the second inverter 24 by switching operation of a relay control module (e.g., corresponding to the relay control module 111 of FIG. 3). Therefore, it is possible to improve efficiency of the inverters 23 and 24 and maintain the operation ratio at the same time.

In addition, the switching module may conveniently be an insulated gate bipolar transistor, a relay switch, etc.

Third Embodiment

Figure 9:
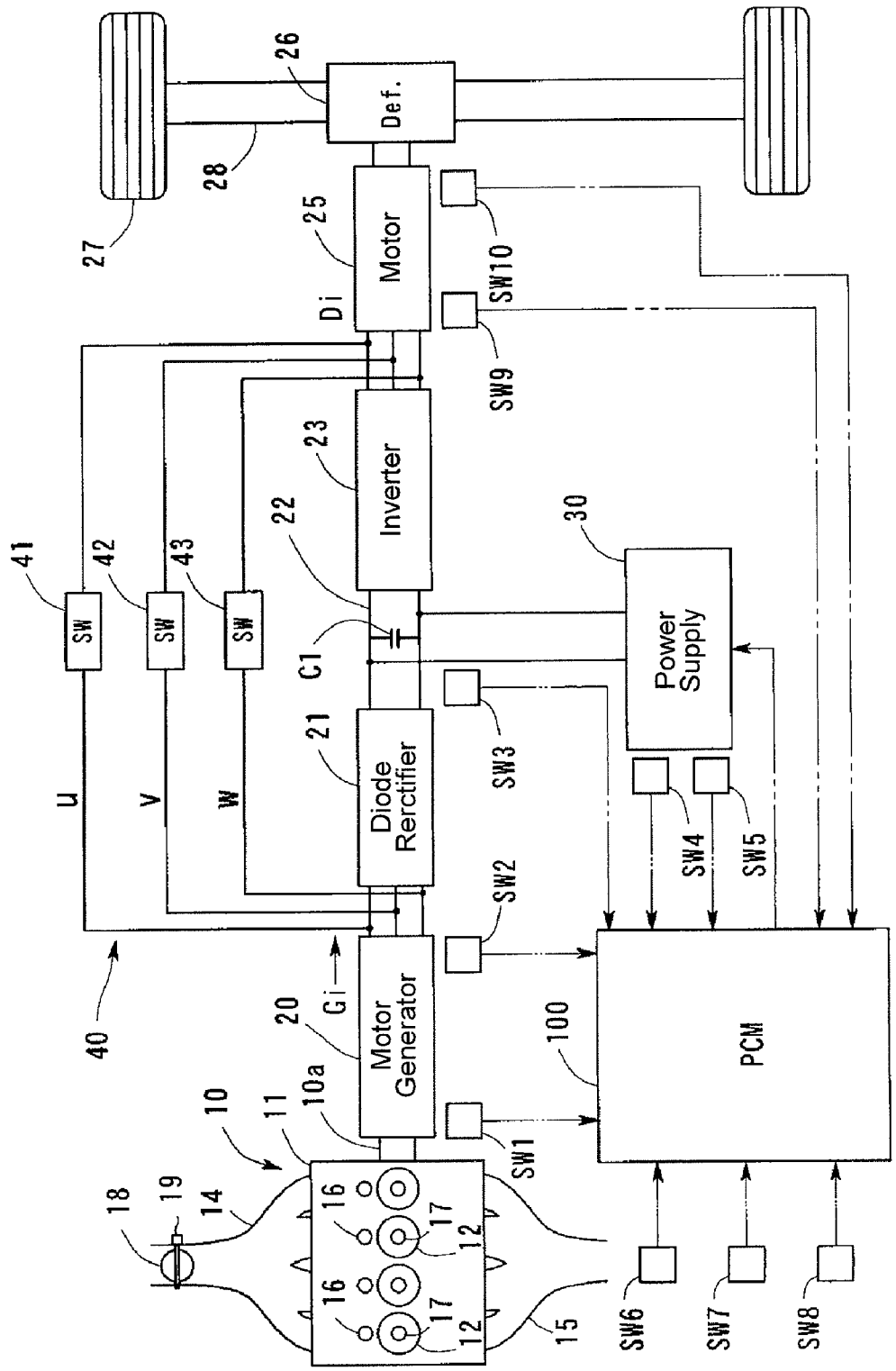
FIG. 9 is a schematic block diagram of the hybrid electric vehicle according to still another embodiment.

Next, still another embodiment of the present invention will be explained. FIG. 9 is a schematic block diagram of the hybrid electric vehicle according to this embodiment. For the vehicle of this embodiment, an electric motor generator 20, a DC bus line 22, and an inverter 23 constitute a first power feed channel of three phases. In addition, a bypass circuit 40 that constitutes a second feed channel in parallel with the first feed channel is provided between the motor generator 20 and the motor 25.

In this embodiment, the bypass circuit 40 is constituted with AC bypass switches 41-43 provided corresponding to phases of the motor generator 20 (u-phase, v-phase, and w-phase), respectively.

Figure 10:
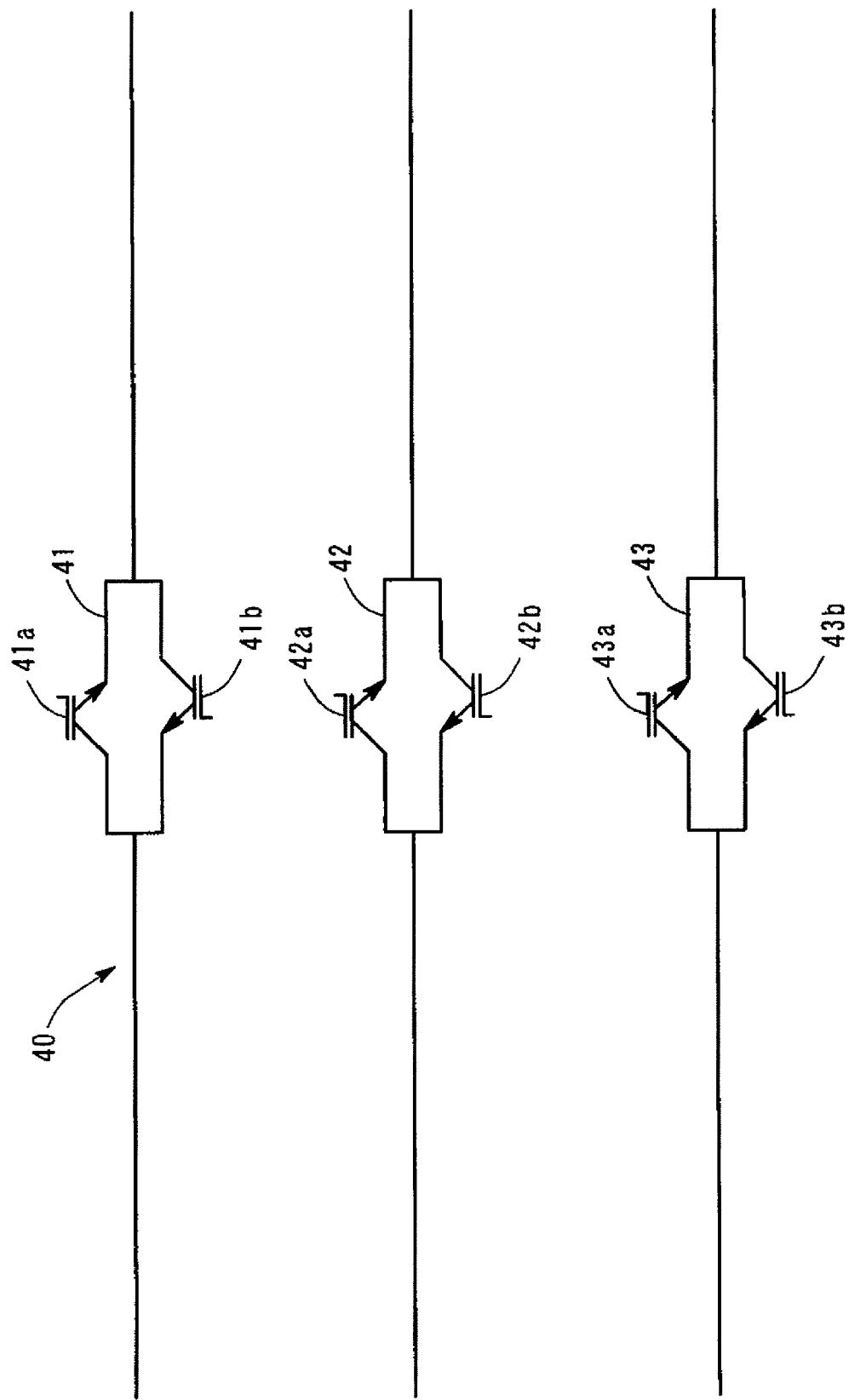
FIG. 10 is a circuit diagram showing semiconductor switches of a bypass circuit of FIG. 9.

Referring also to FIG. 10, which is a circuit diagram showing a detail of the AC bypass switches 41-43 shown in FIG. 9, the AC bypass switches 41-43 are implemented with semiconductor switches, each constituted with a pair of transistors 41a-43a for one current direction that controls current flowing from the motor generator 20 into the motor 25, and transistors 41b-43b for the opposite current direction that controls current flowing from the motor 25 into the motor generator 20, respectively. The control unit 100 controls ON/OFF operation of the transistors 41a-43a and 41b-43b.

Figure 11:
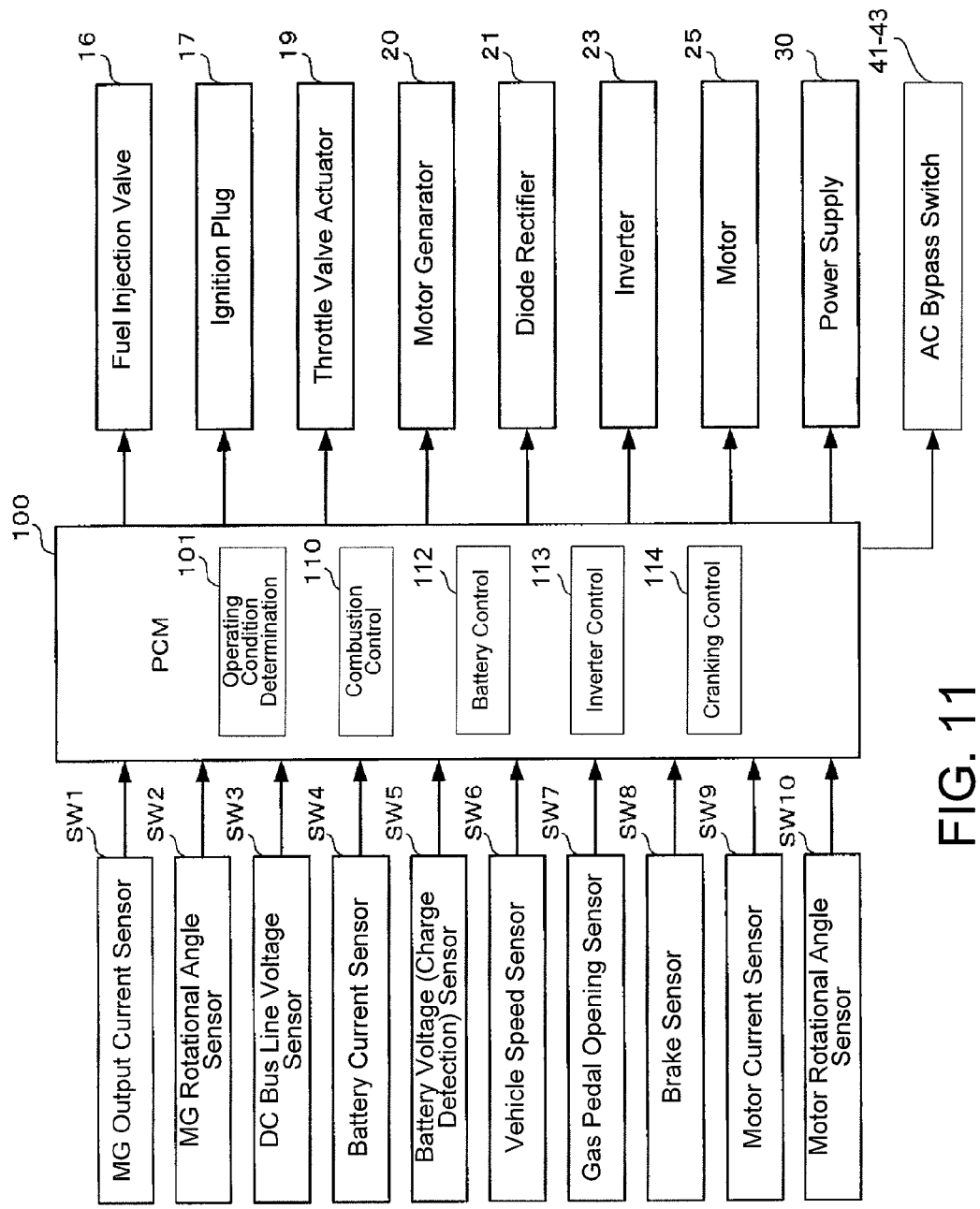
FIG. 11 is a block diagram of the hybrid electric vehicle shown in FIG. 9.

Referring now to FIG. 11, in order to control an operating condition of the motor 25 or a power feeding method, the control unit 100 is connected to input components, such as a motor current sensor SW9 provided to the motor 25, and a motor rotational angle sensor SW10.

Output components of the control unit 100 includes the AC bypass switches 41-43, fuel-injection valves 16, spark plugs 17, throttle valve actuators 19, electric motor generator 20, diode rectifier 21, and inverter 23.

In this embodiment, an operating-condition determination module 101 that logically constitutes a portion of the control unit 100 determines whether cranking of the engine 10 by the motor generator 20 is necessary. The control unit 100 also includes a memory that stores a data map for the determination of the engine cranking, which may be obtained from experiments in advance. The control unit 100 performs the determination by a known method based on outputs from a vehicle speed sensor SW6, a gas-pedal opening sensor SW7, a brake sensor SW8, and a battery voltage sensor SW5.

In addition, an inverter control module 113 logically constitutes the control unit 100 so that it controls an ON/OFF operation of the inverter 23 to control power supply to the motor 25.

In this embodiment, the control unit 100 also logically constitutes a cranking control module 114 that controls startup of the engine 10 using the motor generator 20. In this embodiment, the cranking control module 114 also controls current when cranking operation of the engine 10 is performed by the motor generator 20 and when supplying power to the motor generator 20. The cranking control module 114 also controls switching by the inverter 23 and the AC bypass switches 41-43. As a result, it is possible to convert DC current output from the power supply module 30 into single-phase AC current by the inverter 23, to make the DC current flow to the AC bypass switches 41-43 as it is, and to convert current flowing through the bypass circuit 40 into three-phase AC current by the AC bypass switches 41-43.

Figure 12:
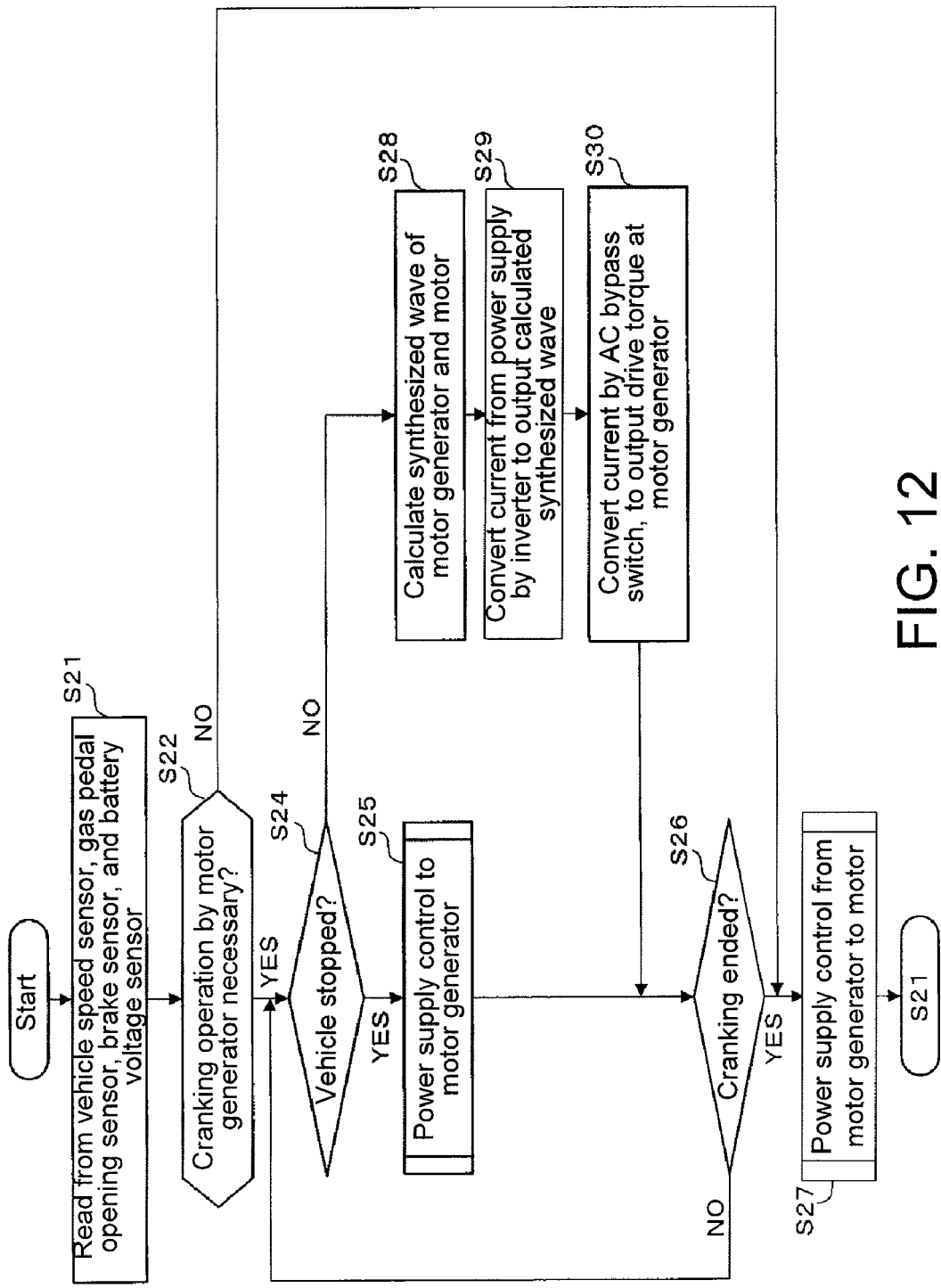
FIG. 12 is a flowchart showing an example of control by a control unit shown in FIG. 11.

Referring to FIG. 12, which is a flowchart showing an example control routine executed by the control unit 100 according to this embodiment. The control unit 100 monitors signals from the input components even when the vehicle is stopped. In other words, at Step S21, the control unit 100 reads outputs from the vehicle speed sensor SW6, the gas-pedal opening sensor SW7, the brake sensor SW8, and the battery voltage sensor SW5. Then, at Step S22, the control unit 100 determines whether engine cranking by the motor generator 20 is necessary by comparing these outputs and conditions for the engine cranking stored in the map.

If the cranking operation is determined to be unnecessary, at Step S27, the control unit 100 performs a power supply control subroutine to the motor 25, and it then proceeds back to Step S21. The power supply control subroutine S27 converts a primary current Gi from the motor generator 20 by the diode rectifier 21 and the inverter 23 that constitute the first feed channel as similar to a well-known configuration, into a secondary current Di suitable for driving the motor 25, and it is then supplied to the motor 25. Alternatively, because the bypass circuit 40 is provided as the second feed channel in this embodiment, the primary current Gi from the motor generator 20 may be converted into the secondary current Di according to the operating condition by using the AC bypass switches 41-43 of the bypass circuit 40 to supply it to the motor 25.

On the other hand, when the cranking operation is determined to be necessary at Step S22, then, at Step S24, the control unit 100 further determines whether the vehicle is stopped.

If the vehicle is stopped, at Step S25, the control unit 100 then executes the power supply control subroutine to the motor generator 20 (described later in detail), and cranking of the engine 10 is then performed by this subroutine. Next, at Step S26, the control unit 100 determines whether the engine cranking has been ended. If it is not ended, the control unit 100 then proceeds back to Step S24, and on the other hand, if the cranking has been ended, the control unit 100 then executes the subroutine of Step S27. In this embodiment, the determination at Step S24 or Step S26 is performed by detecting the engine speed, and determining whether the engine speed is lower than a predetermined value.

On the other hand, at Step S24, if the vehicle is traveling, the control unit 100 then performs a control to supply power to both of the motor generator 20 and the motor 25. More specifically, the control unit 100 proceeds to Step S28 to calculate a synthetic wave of three-phase AC current necessary for driving the motor generator 20, and three-phase AC current necessary for driving the motor 25. Then, at Step S29, the control unit 100 causes the inverter 23 to convert DC current output from the power supply module 30 so as to output the calculated synthetic wave. As a result, the motor 25 is driven by the AC component of the synthetic wave for driving the motor 25. Further, the control unit 100 controls the AC bypass switches 41-43 so that the synthetic wave is converted to three-phase AC current suitable for driving the motor generator 20. As a result, at Step S30, the motor generator 20 is also driven by current suitable for cranking the engine 10. Then, the control unit 100 proceeds to Step S26 to repeat the processes as described above.

Figure 13A:
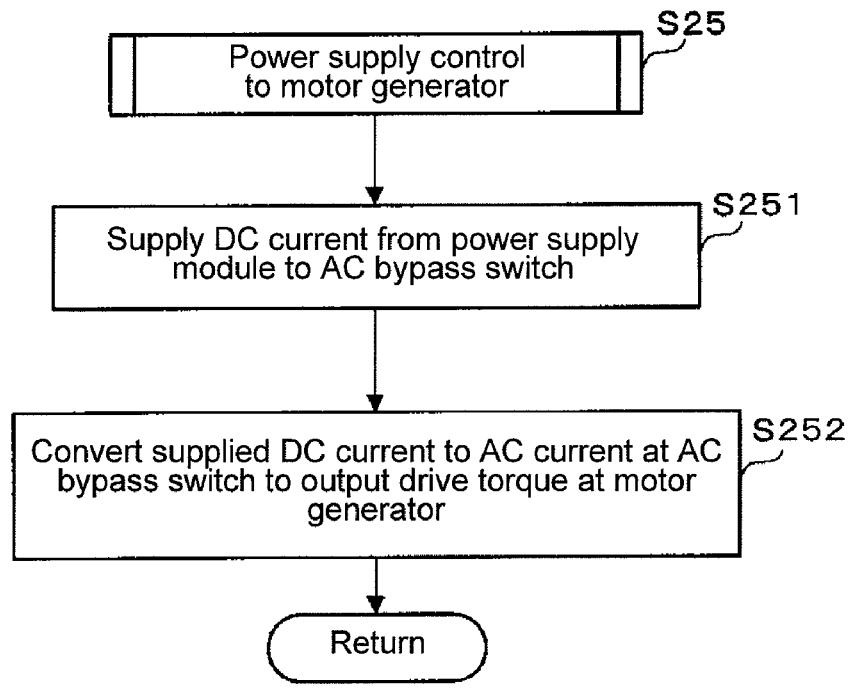
FIG. 13A is a flowchart showing a subroutine of a power-supply control to a motor generator, shown in FIG. 12.
Figure 13B:
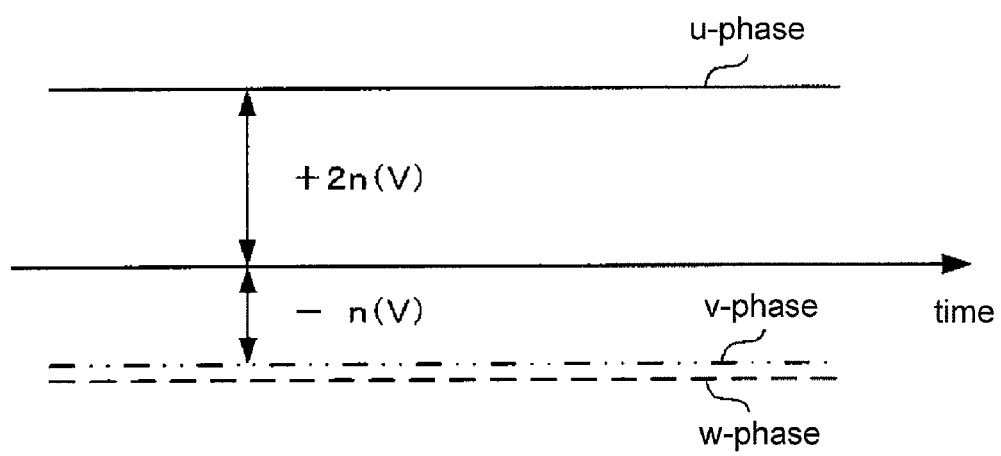
FIG. 13B is a graph showing phase characteristics when the subroutine of FIG. 13A is executed.
Figure 14A:
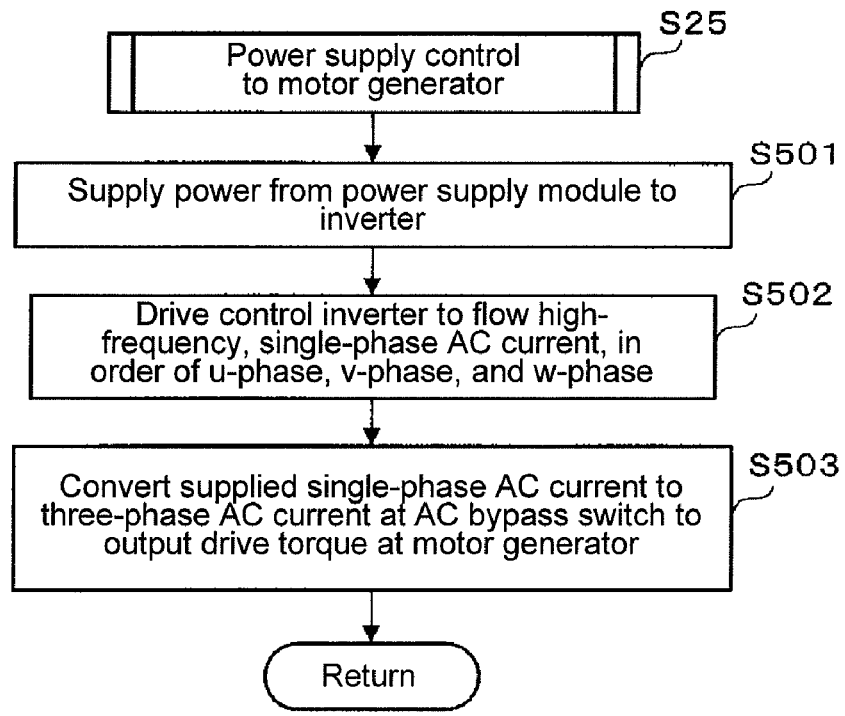
FIG. 14A is a flowchart showing another subroutine of the power-supply control to the motor generator, shown in FIG. 12.
Figure 14B:
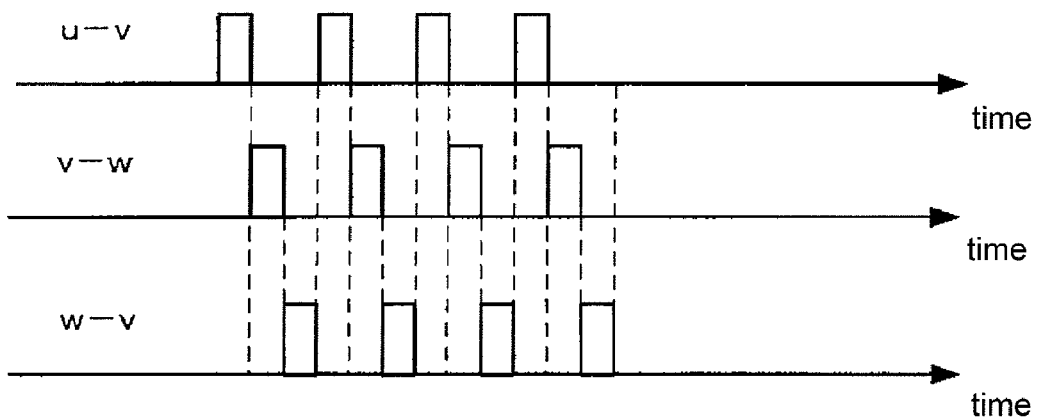
FIG. 14B is a graph showing phase characteristics when the subroutine of FIG. 14A is executed.

FIGS. 13A and 14A are two examples of the power supply control subroutine to the motor generator 20 illustrated in the flowchart of FIG. 12. FIGS. 13B and 14B are graphs showing, respectively, phase characteristics when the subroutines are performed.

First, as shown in the example of FIGS. 13A and 13B, at Step S251, the control unit 100 causes the DC current output from the power supply module 30 to flow as it is from the inverter 23 through the AC bypass switches 41-43. Then, at Step S252, the control unit 100 causes the AC bypass switches 41-43 to convert the DC current to AC current to output drive torque from the motor generator 20.

More specifically, as shown in FIG. 13B, a positive voltage is supplied to a line among three lines corresponding to three phases (e.g., u-phase), and a negative voltage is supplied to two other lines (e.g., v-phase and w-phase) and, thus, the power supply module 30 is controlled so that DC current flows as a whole. In this example, an absolute value of the voltage in the line to which the positive voltage is applied is set to twice the absolute value of the voltage "n" in the line(s) to which the negative voltage is applied. However, this aspect of FIG. 13B is only an example, and the positive voltage may be applied to two or more lines.

Thus, in this example, at the cranking control step (Step S25), DC current supplied from the power supply module 30 is converted to AC current by the AC bypass switches 41-43, and the converted AC current is then supplied to the motor generator 20. In this case, when supplying power from the power supply module 30 through the inverter 23 to the bypass circuit 40, a portion of the current from the inverter 23 flows into the motor 25. However, because the current output from the inverter 23 is DC current, the motor 25 does not unintentionally operate even if the current flows into the motor 25. Therefore, without providing any additional means, power can be supplied to the motor generator 20, and startup (cranking) of the engine 10 can be safely achieved by the motor generator 20. In addition, because a complicated conversion control by the inverter 23 is unnecessary, the control may be simplified, thereby increasing reliability of the system.

On the other hand, for the example of FIGS. 14A and 14B, at Step S501, power is supplied from the power supply module 30 to the inverter 23. Then, at Step S502, the inverter 23 converts the power to single-phase AC current that flows, for example in the order of u-phase, v-phase, and w-phase, as shown in FIG. 14B. Further, at Step S503, the single-phase AC current is converted to AC current suitable for driving the motor generator 20 by the AC bypass switches 41-43, and the converted AC current is supplied to the motor generator 20. In this example of FIGS. 14A and 14B, the single-phase AC current output from the inverter 23 is supplied also to the motor 25. However, because the motor 25 that is a multiphase motor in this example is not driven by the single-phase AC current as shown in FIG. 14B, the motor 25 does not unintentionally operate.

In other words, the motor generator 20 is a multiphase converter, and at the cranking control step (Step S25), the DC current output from the power supply module 30 is converted into high-frequency, single-phase AC current by the inverter 23. Then, the converted AC current is converted by the AC bypass switches 41-43 into the multiphase AC current corresponding to number of phases of the motor generator 20, to supply power to the motor generator 20. When the current is supplied to the motor generator 20 from the power supply module 30, high-frequency, single-phase AC current is generated by the inverter 23. Therefore, even if the current flows into the motor 25, the motor 25 does not unintentionally operate. In addition, because the motor generator 20 can be operated by the AC bypass switches 41-43, startup (cranking) of the engine 10 by the motor generator 20 can be safely achieved while the vehicle is stopped.

In this embodiment, the bypass circuit 40 may include various types of conversion circuits that can convert the waveform of primary current Gi. For example, the circuit 40 may be constituted with a matrix converter including a bidirectional ON/OFF switch, and a filter circuit that is provided at its input.

Further, in this embodiment, Step S30 in the flowchart of FIG. 12 may be omitted in order to supply the synthetic wave of the motor generator 20 and the motor 25 as it is to the motor generator 20.

As explained above, the vehicle of this embodiment includes an engine 10; a motor generator 20 that is driven by the engine 10 to generate AC primary current Gi, and is supplied with AC current to output torque; a diode rectifier 21 that converts the primary current Gi to DC current, an inverter 23 that converts the DC current rectified by the diode rectifier 21 to a AC secondary current Di, and a power supply module 30 connected between the diode rectifier 21 and the inverter 23. The vehicle further includes a first feed channel for supplying current to the motor 25 for driving the vehicle through the diode rectifier 21 and the inverter 23 in series; a second feed channel provided in parallel with the first feed channel, through which the primary current Gi flows to the motor 25; an AC bypass switches 41-43 provided in the second feed channel that converts waveform of the primary current Gi, and a control unit 100 that controls the supply current in the feed channels. The control unit 100 includes a function to determine whether cranking of the engine 10 by the motor generator 20 is necessary. The control unit 100 includes an operating-condition determination module 101 that determines an operating condition of the vehicle; and a cranking control module 114 that regulates driving current from the inverter 23 to the motor 25 while the vehicle is stopped when the cranking is determined to be necessary, while supplying the power of the power supply module 30 from the inverter 23 through the second feed channel to the motor generator 20.

Further, the method of controlling the hybrid electric vehicle of this embodiment includes, as shown in FIGS. 12-14, determining an operating condition of the vehicle (Step S21); determining whether cranking of the engine 10 is necessary (Step S22); and when the cranking of the engine 10 is determined to be necessary while the vehicle is stopped (YES at both Steps S22 and S24), regulating driving current from the inverter 23 to the motor 25, while supplying power of the power supply module 30 from the inverter 23 through the second feed channel to the motor generator 20 (the power supply control subroutine of Step S25).

Therefore, in this embodiment, because the primary current Gi from the motor generator 20 is converted to DC current using the diode rectifier 21, loss of the power generation system can be significantly reduced. In addition, the bypass circuit 40 is provided as the second feed channel in parallel with the first feed channel that is constituted with the diode rectifier 21, the motor generator 20, etc. The primary current Gi from the bypass circuit 40 to the motor generator 20 is waveform-converted to provide it to the motor 25. Therefore, also in this aspect, loss of the power generation system can be significantly reduced. When there is a cranking request by the motor generator 20 while the vehicle is stopped, the power from the power supply module 30 can be supplied from the inverter 23 through the bypass circuit 40 to the motor generator 20. In addition, because the supply current from the inverter 23 to the motor 25 is regulated at the cranking control step (the supply current control subroutine of Step S25), there is no possibility that the vehicle at stop may unintentionally begin to travel.

This embodiment merely illustrates an example of the present invention and, thus, the invention is not limited to this embodiment.

Fourth Embodiment

Figure 15:
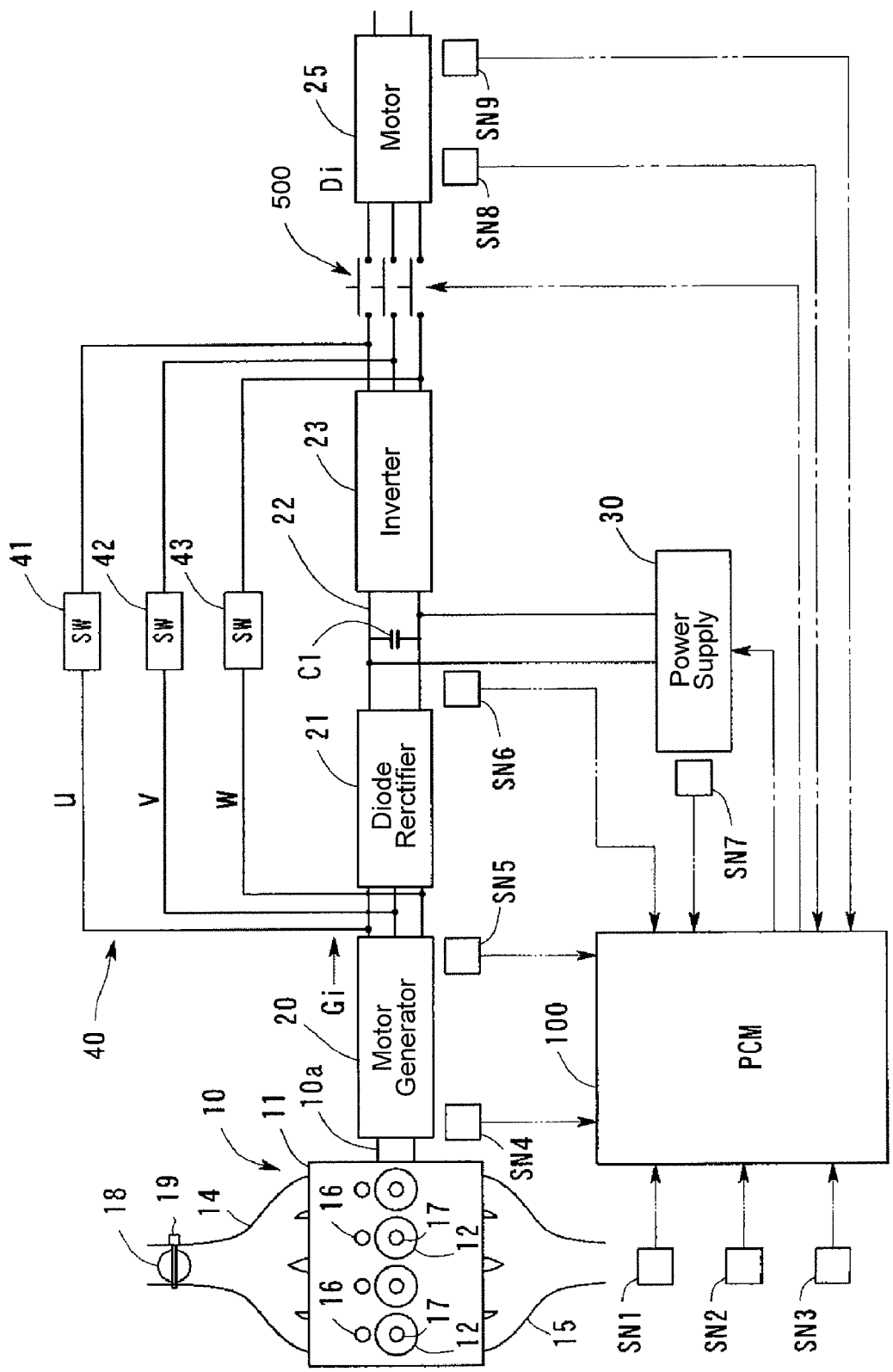
FIG. 15 is a schematic block diagram of the hybrid electric vehicle according to another embodiment.

FIG. 15 is a schematic block diagram of a hybrid electric vehicle according to another embodiment of the invention. This embodiment is only different from the previous embodiment of FIG. 9, in that a three-phase power supply switch 500 is provided between the inverter 23 and the motor 25, and the power supply switch 500 is configured so that its open and close operation is controlled by the control unit 100.

Figure 16:
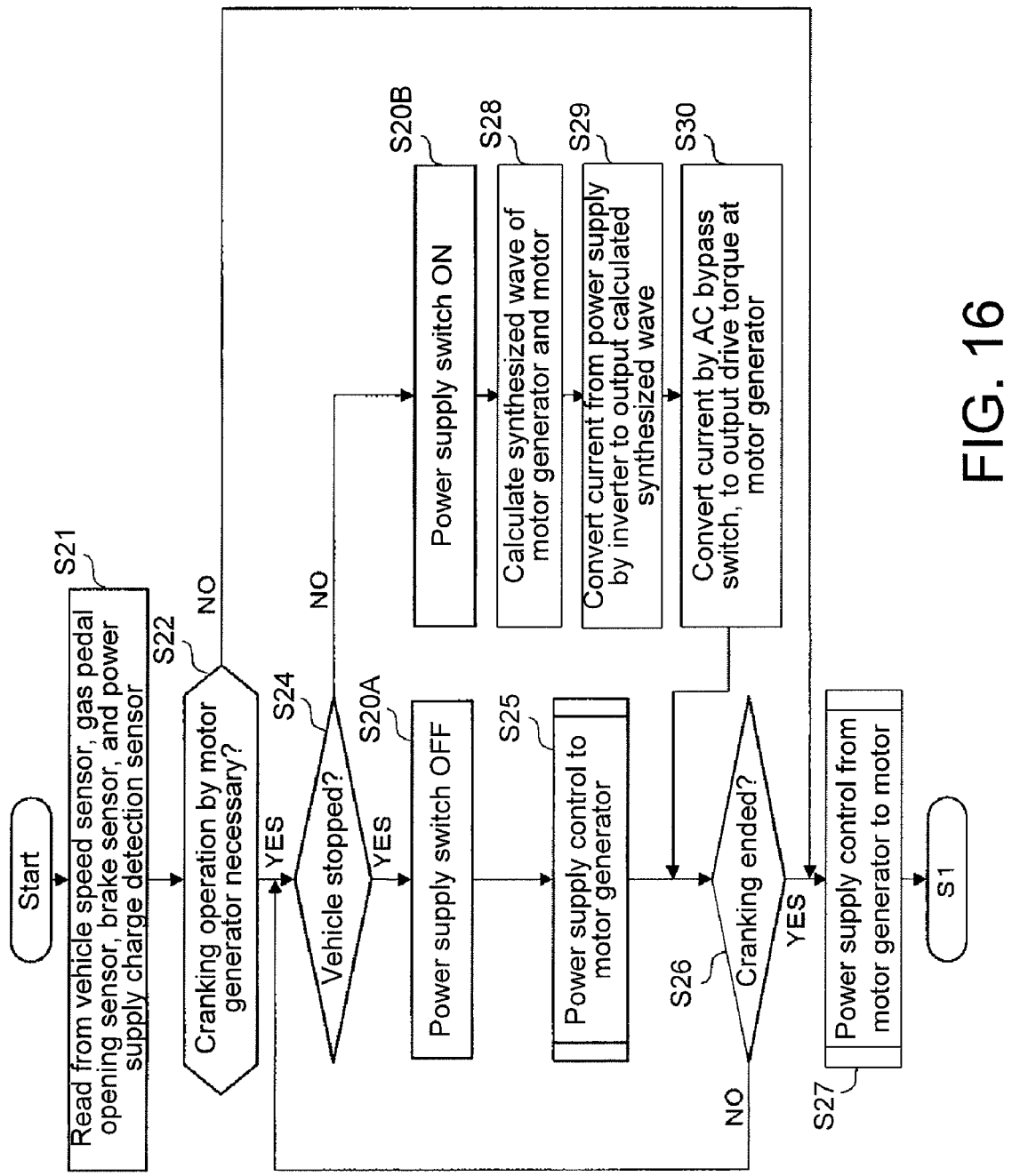
FIG. 16 is a flowchart showing an example of control by a control unit shown in FIG. 15.

Referring to FIG. 16, which is a flowchart showing an example control routine by the control unit 100 of this embodiment. In this embodiment, the control is only different from the flowchart of FIG. 12 in that, at Step S24, when the control unit 100 determines that the vehicle is stopped, it then turns the power supply switch 500 OFF at Step S20A, and when it determines that the vehicle is traveling, it then turns the power supply switch 500ON at Step 20B.

Thus, because the power supply switch 500 is turned OFF when the vehicle is stopped, current does not flow into the motor 25 even if power is supplied from the power supply module 30 to the inverter 23. Therefore, a simple control can be achieved also for the power supply control subroutine of Step S25.

Figure 17:
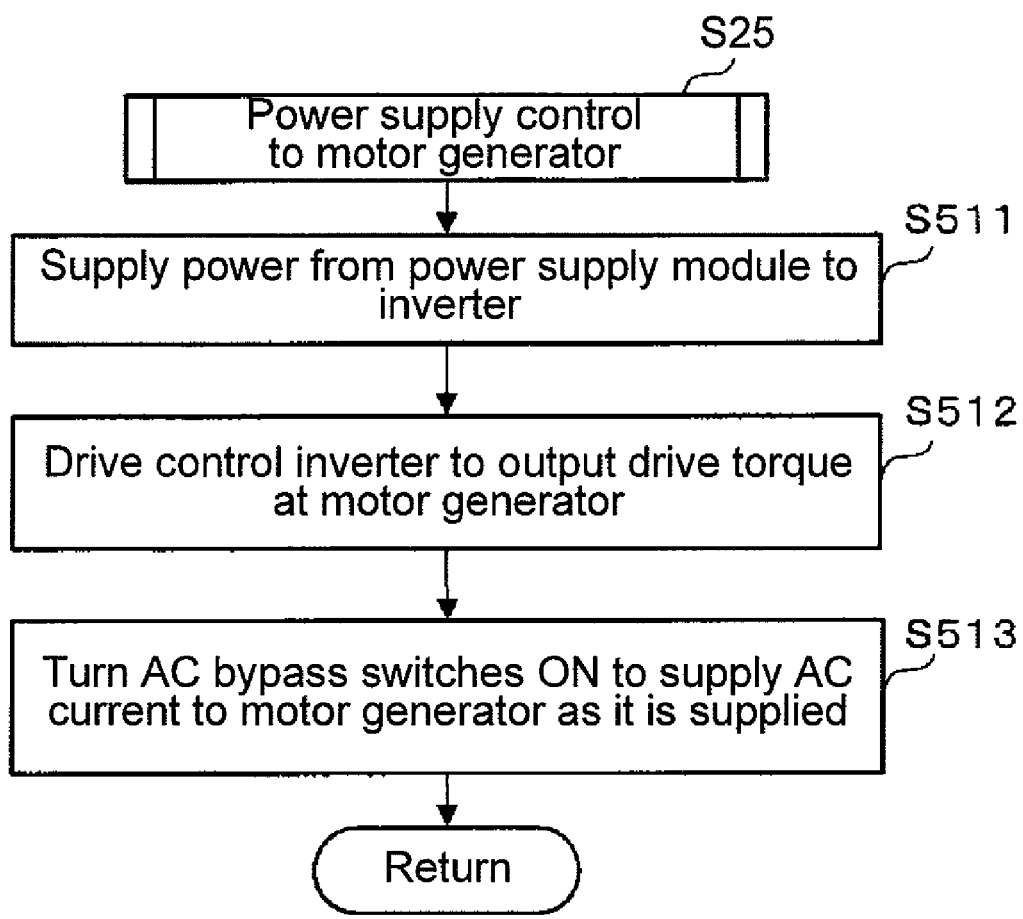
FIG. 17 is a flowchart showing a subroutine of a power-supply control to a motor generator, shown in FIG. 16.

Referring to FIG. 17, which is a flowchart showing an example of the power supply control subroutine of Step S25, the control unit 100 first causes power to be supplied from the power supply module 30 to the inverter 23 at Step S511. Then, at Step S512, the control unit 100 causes the DC current supplied to the inverter 23 to be converted into three-phase AC current suitable for driving the motor generator 20. In this case, because the AC bypass switches 41-43 of the bypass circuit 40 are ON to provide the supplied AC current to the motor generator as it is, the AC current converted by the inverter 23 is supplied from the bypass circuit 40 to the motor generator 20.

Thus, in the embodiment shown in FIGS. 15-17, the supply current cut-off step at Step S20A that cuts off the channel between the first feed channel and the motor 25 prior to the cranking control step (i.e., the supply current control subroutine of Step S25) is further provided. For this reason, the power supply to the motor 25 is prevented by the supply current cut-off step at Step S20A, thereby, safely starting (cranking) the engine 10 by the motor generator 20 while the vehicle is stopped.

As explained above, the hybrid electric vehicle of this embodiment includes a motor generator 20 that generates AC current while being driven by the engine 10, and also functions as a starter for driving the engine 10 at the engine startup; a motor 25 that drives the vehicle, a diode rectifier 21 that rectifies the AC current generated by the motor generator 20; an inverter 23 that is connected to the feed channel 22 between the diode rectifier 21 and the motor 25, and converts DC current of the feed channel 22 into AC current; a power supply module 30 connected between the diode rectifier 21 and the inverter 23; a first feed channel that supplies current to the motor 25 for driving the vehicle through the diode rectifier 21 and the inverter 23 in series; a second feed channel that makes conductive between the motor generator 20 and the power supply module 30 with a bypass through at least the diode rectifier 21; and AC converters 41, 42, 43, and 24 provided in the second feed channel.

In this aspect, by connecting the diode rectifier 21 to the motor generator 20 driven by the engine 10, efficiency of the power generation system can be improved, and the power supply system of reduced loss can be achieved. In addition, a second feed channel is provided so that the power supply module 30 and the motor generator 20 communicate with each other, bypassing at least the diode rectifier 21. Further, the AC converters 41, 42, 43, and 24 are provided in the second feed channel. Therefore, when it is necessary to crank the engine 10 by the motor generator 20, power from the power supply module 30 can be supplied to the motor generator 20 through the second feed channel. Therefore, the engine cranking by the motor generator 20 can be performed when power supply to the motor 25 is necessary, as well as when power supply to the motor 25 is unnecessary. The AC converter may conveniently include, but is not limited to, a semiconductor switch or a matrix converter.

Summary of the Embodiments

In the above embodiments, the control unit 100 may be provided to control power supply to the first and second feed channels, as shown in FIGS. 9 and 15. The control unit 100 may include a function to determine whether engine cranking by the motor generator 20 is necessary, and may include the operating-condition determination module 101 that determines an operating condition of the vehicle, and the cranking control module 114 that supplies power from the power supply module 30 to the motor generator 20 through the second feed channel when the cranking is determined to be necessary. In this aspect, when there is a cranking request by the motor generator 20, the power from the power supply module 30 can be supplied to the motor generator 20 through the second feed channel.

The AC converters may be the semiconductor switches 41, 42, and 43. In this aspect, the power supply to the motor generator may be realized with simple electronic components.

The AC converter may be the second inverter 24 provided in parallel with the first feed channel, as shown in FIG. 1. In this aspect, the vehicle may include the switching module 29 that can selectively switch between the motor power feeding mode in which the power supply module 30 is connected to the motor 25 through the second inverter 24, and the starter power feeding mode in which the power supply module 30 is connected to the motor generator 20 through the second inverter 24. In this aspect, two inverters 23 and 24 are provided so that they are connected in parallel with the feed channel to which the diode rectifier is connected. Thus, for example, when the motor 25 needs to be driven at the engine startup, it may be possible to drive the motor 25 by the first inverter 23, while driving the motor generator 20 by the second inverter 24. In addition, because two or more inverters are provided, when the current necessary for power supply is small, one of the inverters may be turned OFF. Thus, it is possible to improve a loading rate of the active inverter, thereby improving efficiency of the inverter as well as improving efficiency of the entire power supply system.

The switching module may conveniently be an insulated gate bipolar transistor (IGBT), a relay switch, etc. Preferably, the switching module may be the relay switch 29. In this aspect, a circuit with reduced loss can be achieved, compared with the case where the insulated gate bipolar transistor is adopted.

The control module 100 may be configured so that it turns OFF the second inverter 24 before switching the relay switch 29 when the second inverter 24 is ON. In this aspect, because the switching operation can be performed in a state where current is not supplied to the relay switch 29 as the switching module, deterioration of the relay switch 29 can be controlled, thereby extending life of the switch.

The vehicle may include the power feed line 29c for loading provided to the switching module, and the electric equipment 50 connected to the power feed line 29c to which power can be supplied from the second inverter 24. In this aspect, in an operating range in which sufficient power can be provided only by the first inverter 23, by supplying the power from the second inverter 24 to a predetermined electric equipment 50, efficiency of each inverter can be improved, and operation ratio of the inverters can be maintained. The electric equipment 50 may be an AC power unit of 100V or an air-conditioning unit for the vehicle cabin.

The vehicle may include the cranking control module 100 that supplies power from the power supply module 30 from the inverter 23 through the second feed channel to the motor generator 20, while regulating driving current from the inverter 23 to the motor 25, when cranking of the engine 10 is determined to be necessary while the vehicle is stopped, as shown in FIGS. 9 and 15. In this aspect, because the cranking control module 100 regulates the current from the inverter 23 to the motor 25, there is no possibility that the vehicle at stop unintentionally starts.

The cranking control module 100 may convert DC current supplied from the power supply module 30 into AC current by the AC converters 41, 42, and 43 to supply it to the motor generator 20. In this aspect, when supplying the power from the power supply module 30 through the inverter 23 to the second feed channel, a portion of current flows from the inverter 23 into the motor. However, because the current output from the inverter 23 is DC current, the motor 25 does not unintentionally operate even if the current flows into the motor 25. Therefore, without providing a dedicated means, power can be supplied to the motor generator 20, and startup (cranking) of the engine 10 by the motor generator 20 can be safely achieved. In addition, because a complicated conversion control by the inverter 23 is unnecessary, the control may be simplified and thereby increasing reliability of the control.

The motor generator 20 shown in FIG. 9 may be a multiphase converter, and the cranking control module 100 may cause the inverter 23 to convert DC current output from the power supply module 30 into high frequency, single-phase AC current, and then causes the AC converters 41, 42, and 43 to convert the single-phase AC current into multiphase AC current corresponding to number of the phases of the motor generator 20 to supply the multiphase AC current to the motor generator 20. In this aspect, because the high frequency, single-phase AC current is generated by the inverter 23 upon supplying the current from the power supply module 30 to the multiphase converter, the motor 25 does not unintentionally operate even if the current flows into the motor 25. Also in this case, because the motor generator 20 can be operated by the AC converters 41, 42, and 43, startup (cranking) of the engine 10 by the motor generator 20 can be safely achieved while the vehicle is stopped.

The vehicle may include the switch 500 provided between the inverter 23 and the motor 25, as shown in FIG. 15. In addition, the cranking control module 100 may be configured to close the switch 500 when cranking of the engine 10 is determined to be necessary while the vehicle is stopped prior to supplying power from the power supply module 30 to the motor generator 20. In this aspect, because the power supply to a motor is prevented by the supply current cut-off step, startup (cranking) of the engine 10 by the motor generator 20 can be safely achieved while the vehicle is stopped.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A hybrid electric vehicle comprising:
   a motor-generator driven by an engine to generate alternating current,
   wherein the motor-generator is further configured to start the engine;
   a motor for driving the vehicle;
   a diode rectifier to rectify alternating current generated by the motor-generator;
   an inverter connected to a feed circuit between the diode rectifier and the motor to convert direct current in the feed circuit into alternating current;
   a power supply connected to a line connecting the diode rectifier with the inverter;
   a first feed circuit to supply current to the motor to drive the vehicle through the diode rectifier and the inverter in series;
   a second feed circuit to connect the motor-generator with the power supply while bypassing at least the diode rectifier;
   an alternating current converter provided in the second feed circuit, wherein the alternating current converter includes a second inverter placed in parallel with the first feed circuit; and
   a switch device to selectively switch between a motor power feed mode where the power supply is connected to the motor via the second inverter and a starter power feed mode where the power supply is connected to the motor-generator via the second inverter.

2. The hybrid electric vehicle according to claim 1, further comprising a controller to control power distribution to the first feed circuit and the second feed circuit, the controller including:
   an operating condition determining module configured to determine an operating condition of the vehicle,
   wherein the operating condition is a demand to crank the engine with the motor-generator; and
   a cranking control module to supply power from the power supply to the motor-generator via the second feed circuit when a demand to crank the engine is detected.

3. The hybrid electric vehicle according to claim 2,
   wherein the cranking control module is configured to control the inverter and the second feed circuit such that electric power generated by the power supply is supplied from the inverter to the motor-generator via the second feed circuit while driving current for the motor from the inverter is restricted, when there is a cranking demand while the vehicle is stopped.

4. The hybrid electric vehicle according to claim 3,
   wherein the cranking control module is configured to control the inverter and the second feed circuit such that direct current from the power supply is converted to alternating current in the alternating current converter, and
   the alternating current is provided to the motor-generator.

5. The hybrid electric vehicle according to claim 3,
   wherein the motor-generator is a polyphase alternating current device, and
   wherein the cranking control module is configured to control the inverter and the second feed circuit such that direct current from the power supply is converted to high frequency single-phase alternating current in the inverter, and the single-phase alternating current is converted to polyphase alternating current having the same phase number as the motor-generator, and the polyphase alternating current is provided to the motor-generator.

6. The hybrid electric vehicle according to claim 3 further comprising a switch provided between the inverter and the motor, wherein the cranking control module is configured to control the inverter, the second feed circuit and switch such that the switch is shut off before current is fed from the power supply to the motor-generator, when there is a cranking demand while the vehicle is stopped.

7. The hybrid electric vehicle according to claim 1,
wherein the alternating current converter includes a semiconductor switch.

8. The hybrid electric vehicle according to claim 1,
wherein the switch device is a relay switch.

9. The hybrid electric vehicle according to claim 8, further comprising a controller configured to switch the relay switch from a first mode to a second mode after turning off the second inverter when a switch between the first mode and the second mode is requested while the second inverter is in an on-state.

10. The hybrid electric vehicle according to claim 1, further comprising a feed line for an electric load, which is provided in the switch device, and an electric component connected to the feed line such that the second inverter can feed electricity to the electric component.

11. The hybrid electric vehicle according to claim 10,
wherein the electric component is a 100V alternating current source.

12. The hybrid electric vehicle according to claim 10,
wherein the electric component is an air-conditioning unit for a cabin of the vehicle.

* * * * *